United States Patent
Rogers

(10) Patent No.: US 6,556,564 B2
(45) Date of Patent: Apr. 29, 2003

(54) SCHEDULED INTERNET PROTOCOL TELEPHONE INSTRUMENT SYSTEM

(75) Inventor: Steven A. Rogers, Alton, NH (US)

(73) Assignee: Cetacean Networks, Inc., Portsmouth, NH (US)

( * ) Notice: Subject to any disclaimer, the term of this patent is extended or adjusted under 35 U.S.C. 154(b) by 66 days.

(21) Appl. No.: 09/780,685

(22) Filed: Feb. 8, 2001

(65) Prior Publication Data

US 2001/0033565 A1 Oct. 25, 2001

Related U.S. Application Data

(60) Provisional application No. 60/181,099, filed on Feb. 8, 2000.

(51) Int. Cl.$^7$ .............................................. H04L 12/66
(52) U.S. Cl. ...................... 370/352; 370/443; 370/498; 379/88.17
(58) Field of Search ................................ 370/352, 353, 370/354, 355, 356, 389, 419, 474, 476, 442, 443, 444, 498; 709/88.17

(56) References Cited

U.S. PATENT DOCUMENTS

| | | | |
|---|---|---|---|
| 5,526,353 A | 6/1996 | Henley et al. | 370/60.1 |
| 5,610,920 A | 3/1997 | Doll et al. | 370/389 |
| 5,825,873 A | 10/1998 | Duncan et al. | 379/419 |
| 5,832,275 A | 11/1998 | Olds | 395/712 |
| 6,185,184 B1 | 2/2001 | Mattaway et al. | 370/230 |

Primary Examiner—Douglas Olms
Assistant Examiner—Bob A. Phunkulh
(74) Attorney, Agent, or Firm—Weingarten, Schurgin, Gagnebin & Lebovici LLP

(57) ABSTRACT

A LAN telephone which makes voice telephone calls over a local area network (LAN) data network. Acoustic voice sounds are digitally encoded and transmitted as data, over the LAN. The disclosed telephone simultaneously receives LAN data packets and decodes them, translating the data into acoustic audio voice sounds. All communications with the network occur through the use of the LAN, including data for call control and for voice signals. The disclosed LAN telephone uses a packet scheduling technique to prevent packet collision, delay or loss. The scheduling technique relies on time of transmission and arrival to switch packets. Additionally, the disclosed LAN telephone is operable to receive power from a data switch, using LAN wiring. The instrument further includes a means for attaching peripheral devices through an electronic interface system, as well as an internal system for allowing the telephone to be moved, from one connection to another, without changing the telephone number. The instrument also provides a system for automatically changing the internal control software of the instrument, or of any connected peripheral. A system for connecting an external "speaker-phone" system is also disclosed, which gives the instrument's user the ability to place the voice audio source and pickup in a location that is convenient to the user and not necessarily co-located with the instrument itself.

21 Claims, 14 Drawing Sheets

Schedule Assignment for First Telephone "A"

Schedule Assignment for Two Telephones ( "A", and "B") Active

| | | |
|---|---|---|
| Screen record for: | Frost, Jack | |
| Instrument Serial Number: | 343-547-789-2001-34 | |
| Switch: | Lakeside 2 | |
| Switch Slot: | 7 | |
| Switch Port: | 7/24 39 | |
| Physical Location: | 3-230-4 | User Record 180 |
| Instrument Type: | SES-2 | |
| Instrument Description: | Single Executive Station | |
| Extension Number: | 6255 | |

User Record for LAN Phone Auto-ID

*FIG. 9(c)*

| Location Record Switch: | Lakeside 2 | | |
|---|---|---|---|
| Slot: | 3 | | |
| Port: | 1 | 3-230-4 | Frost, Jack |
| | 2 | 3-230-3 | Conference Room, Small |
| | 3 | 3-231-3 | Morgon, Anna |
| | 4 | 4-232-1 | Clayton, Jean |
| | 5 | 5-233-1 | Brockton, George |
| | 6 | 6-234-1 | Unassigned |

Location Record 181

Location Record for LAN Phone Auto-ID

*FIG. 9(d)*

Internal Block Diagram for Speakerphone Accessory

SCHEDULED INTERNET PROTOCOL TELEPHONE INSTRUMENT SYSTEM

CROSS REFERENCE TO RELATED APPLICATIONS

This application claims priority under 35 USC §119(e) to provisional application serial No. 60/181,099, entitled "LOCAL AREA NETWORK (LAN) TELEPHONE INSTRUMENT SYSTEM", and filed Feb. 8, 2000.

STATEMENT REGARDING FEDERALLY SPONSORED RESEARCH OR DEVELOPMENT

N/A

BACKGROUND OF THE INVENTION

The present invention relates generally to telephone instruments, and more specifically to telephone instruments that are directly connected to a data LAN (Local Area Network).

As it is generally known, telephone systems for business use normally consist of a central switch or Private Branch exchange (PBX), illustrated by PBX 16 shown in FIG. 2, which connects to telephones throughout the business via a twisted pair wire 14 and 15. An example of such a system configuration is depicted in FIG. 2. In most cases the PBX 16 will use a single twisted pair cable 14 to connect with the telephone instrument 13. During operation of the system shown in FIG. 2, the PBX 16 sends signals to and receives signals from the telephone instruments 10 and 13 via a frequency translated modem system.

Existing PBX systems typically use dedicated wiring, shown as multi-pair cables 15 in FIG. 2, connected to the PBX 16. The multi-pair cables 15 are connected to punch-down blocks 12. The punch-down blocks 12 are normally placed in a closet on the floor of the office building, near the telephone instruments 10 and 13. The individual station cables 14 are also connected to the punch-down blocks 12. The station cables 14 lead to the wall jacks 11. The telephone instruments 10 and 13 are connected to the system via instrument cables 18 to the wall jack 11. The telephones 10 and 13 are powered via a DC current that is carried by the same pair as that used for signaling. Telephone calls are made outside the premises via a Wide Area Network (WAN) link 17 connected to the PBX unit 16. The WAN link 17 is often a multi-channel circuit, such as what are commonly referred to as "T1" or "PRI" links.

The typical existing PBX system requires dedicated wiring. It does not share wiring with the data LAN that is common in most businesses. Thus, two wiring networks are normally required within an office building, one for data and one for telephones.

Recently, a technique for creating a "virtual" PBX has been employed that is referred to as a "LAN-PBX." In this technique, the telephone instrument uses a common Ethernet LAN cable, instead of a single twisted pair cable, to communicate with the PBX. An illustrative LAN-PBX system is shown in FIG. 3. In this case, the PBX is actually a telephony server 27 with switch control software that is connected to the LAN. The telephones 21, 23 and 25 are Ethernet LAN devices that also communicate over the LAN. Thus the telephony application, consisting of telephones 21, 23, and 25, and a telephony server 27, attached to a WAN interface 28, can utilize the same switch 22 as the computers 24 and network data servers 26. The advantage of the LAN-PBX architecture shown in FIG. 3 is that the telephones 21, 23 and 25 can use the same wiring and data switches as are used to convey LAN data, thus resulting in increased flexibility and overall lower cost.

A significant problem with the LAN-PBX approach illustrated in FIG. 3 is that telephony data has different delivery requirements than normal computer and server data. Telephony data must be delivered on-time (within a few milliseconds), and without delay, on a continuous basis. Normal computer data can usually suffer delays of a few hundred milliseconds without difficulty. Delays of this magnitude (a few hundred milliseconds) are common in computer networks. They occur because computer data is transmitted at a variable and unpredictable rate. As a result, there can be momentary blockages and congestion, even though the network has adequate bandwidth for the average data load.

Existing LAN-PBX systems attempt to solve this problem by giving telephony data priority over computer data. In the event of data congestion, such existing systems pass telephony data ahead of computer data. This priority system can work when only one telephone with data to transmit is present on a given circuit at a given time. However, when a circuit must carry multiple telephone connections, the congestion problem can arise again. This happens because multiple packets with equivalent priority give no means for arbitration. Consider the Telephony Server Link 30 shown in FIG. 3. When multiple telephone calls are placed to the WAN interface 28 they must all pass through the link 30. In that event, multiple telephony data packets, all having equivalent priority, may simultaneously require shared telephony server link 30 resource. A priority mechanism cannot distinguish between them, and the packets cannot interfere with one another.

Another problem with the LAN-PBX is that Ethernet cables and switches make no provision for providing power. Generally, in an Ethernet-based system as shown in FIG. 3, power is provided by a separate telephone power supply 29 at each station or instrument. As a result, it is difficult to operate the entire network in the event of a power outage. The user must provide backup power at each instrument, instead of centrally, as is possible with a typical PBX system.

Additionally, both PBX and LAN-PBX systems have difficulty supporting multiple types of instruments, in a flexible manner. Some instruments need many features, while others need only basic capabilities. There is no convenient way to extend or modify an instrument's behavior without complete replacement. That is, accessories to instruments are rarely supported.

Typical existing PBX systems, such as the one illustrated in FIG. 2, suffer from another problem. The telephone number of a particular handset is determined by the circuit jack to which it is attached. This is inconvenient, as users may need to move a handset from one jack to another, while maintaining the same telephone number. Under such circumstances, the typical PBX user must reconfigure the switch.

Finally, existing LAN telephones are operated by internally stored control software. Such software must normally be installed separately into each instrument. This procedure makes software updates and corrections difficult, since each instrument must be reloaded individually.

For the reasons stated above, it would be desirable to have a LAN telephone instrument system which uses the same wiring system as is used to convey data transmission, and which operates without the delays that may occur in existing systems. It would further be desirable to have a LAN telephone instrument system which a) operates using power supplied over Ethernet cables, b) provides for accessory attachments, c) can maintain a phone number even when moved to a new jack, and d) enables convenient downloading of software.

BRIEF SUMMARY OF THE INVENTION

Consistent with the present invention, a LAN telephone instrument is disclosed. The disclosed LAN telephone uses a Time-based Routing (TBR) technique to schedule packets of voice-telephony data. Through use of the Time-Based Routing technique, the problems of multiple LAN telephone instruments sending contending or colliding packets is avoided. The disclosed LAN telephone operates in connection with a system for providing power to the LAN telephone instrument through an attached LAN cable. This allows multiple LAN telephone instruments to be centrally powered.

The disclosed LAN telephone further includes a technique for automatically providing a remote switch with location of the LAN telephone instrument, thus enabling automatic direction of calls thereto. Additionally, a system for remote configuration of the control program of a LAN telephone instrument is also disclosed, which employs the LAN itself to provide the data connection over which the control program is downloaded.

The present disclosure further includes a system for attachment of telephone instrument accessories, which may be used to extend the functional capability of the LAN telephone instrument. An illustrative accessory, an operator console, is described in detail.

BRIEF DESCRIPTION OF THE SEVERAL VIEWS OF THE DRAWING

The invention will be more fully understood by reference to the following detailed description of the invention in conjunction with the drawings, of which:

FIGS. 9(a), 9(b), 9(c) and 9(d) show software flowcharts and entry fields of an automatic identification system for the disclosed LAN telephone;

DETAILED DESCRIPTION OF THE INVENTION

All disclosures of provisional application serial No. 60/181,099, entitled "LOCAL AREA NETWORK (LAN) TELEPHONE INSTRUMENT SYSTEM", and filed Feb. 8, 2000, are hereby included by reference herein.

Figure 1:
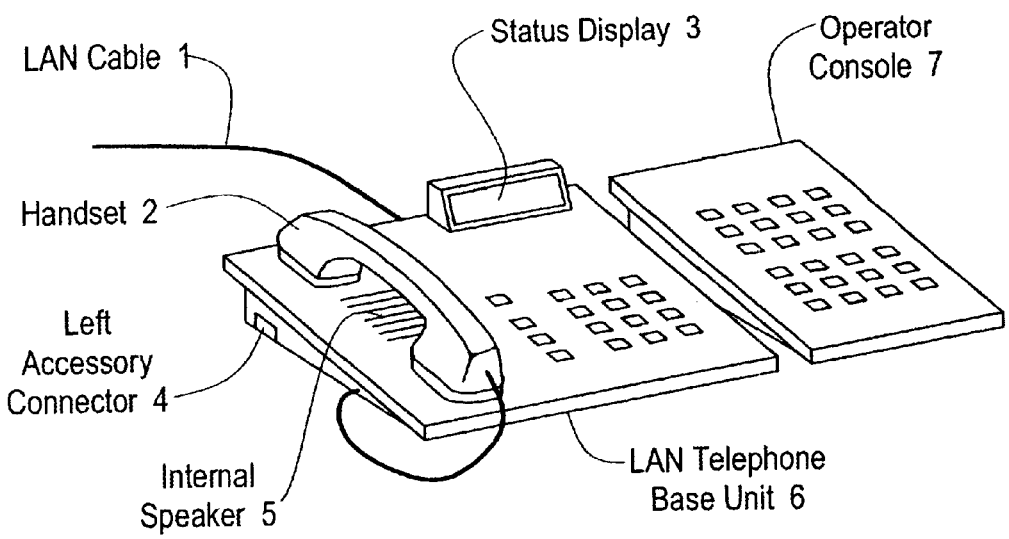
FIG. 1 shows a physical depiction of the LAN telephone, with an operator console accessory unit, and an internal speakerphone unit.
Figure 2:
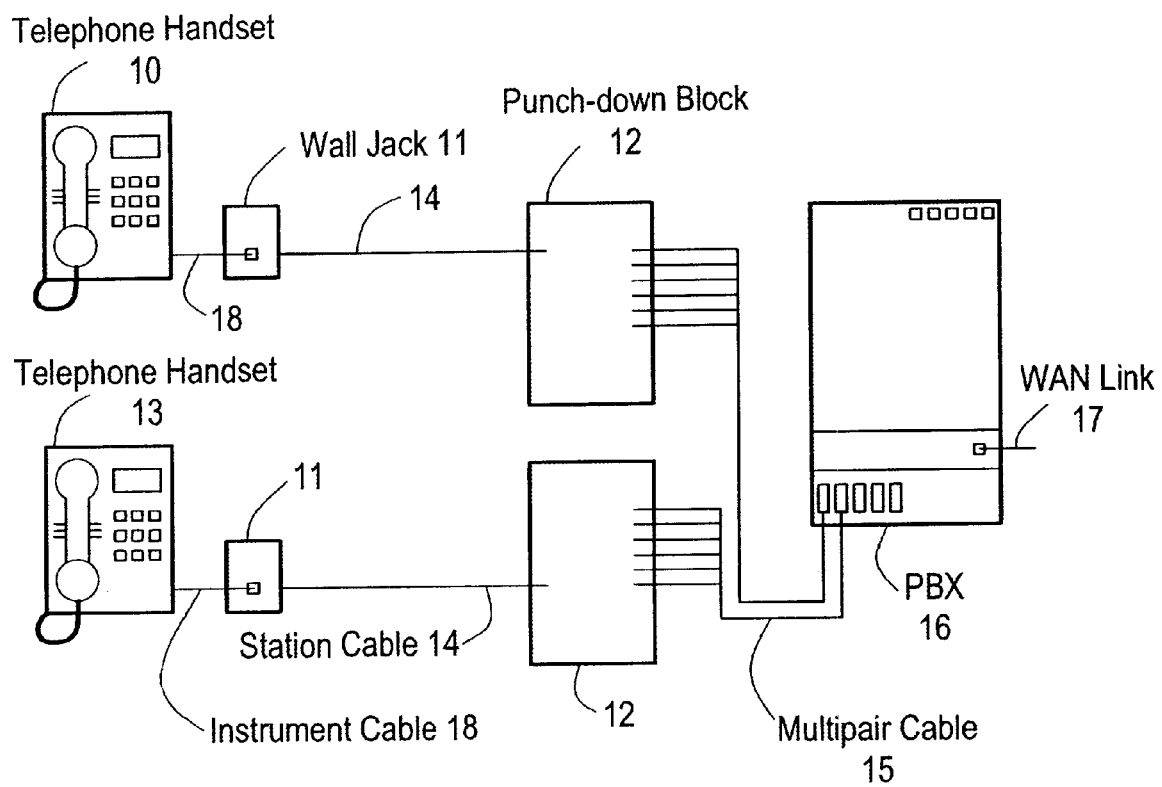
FIG. 2 depicts a typical Private Branch Exchange (PBX)
Figure 3:
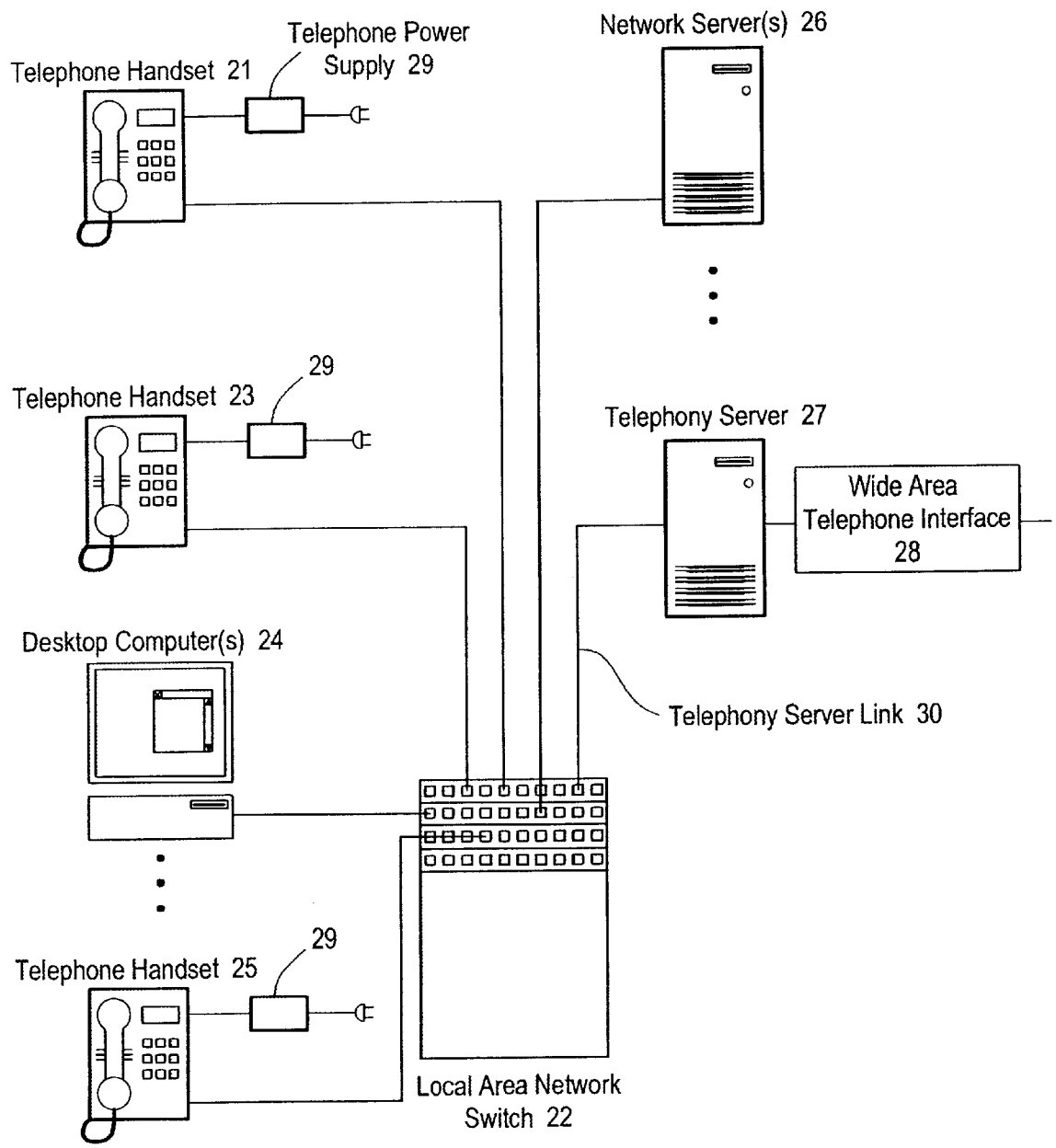
FIG. 3 depicts a typical LAN-PBX system.

FIG. 1 shows a physical representation of an embodiment of the disclosed LAN telephone. The embodiment of the LAN telephone shown in FIG. 1 includes a base unit 6 containing electronics circuitry necessary to provide the functions associated with the base unit 6 as described herein. The base unit 6 supports a handset 2, an internal speaker 5 for speakerphone functions, and a status display 3 for displaying user status information. The base unit 6 may be connected to a data switch via a LAN cable 1, for example by way of a conventional data cable infrastructure, such as that shown in FIG. 3. An accessory connector is provided on each side of the base unit 6, as illustrated by left accessory connector 4. Using the accessory connectors, it is possible to add a variety of accessory devices, including an operator console 7 as shown in FIG. 1, and/or an external speakerphone.

Figure 5:
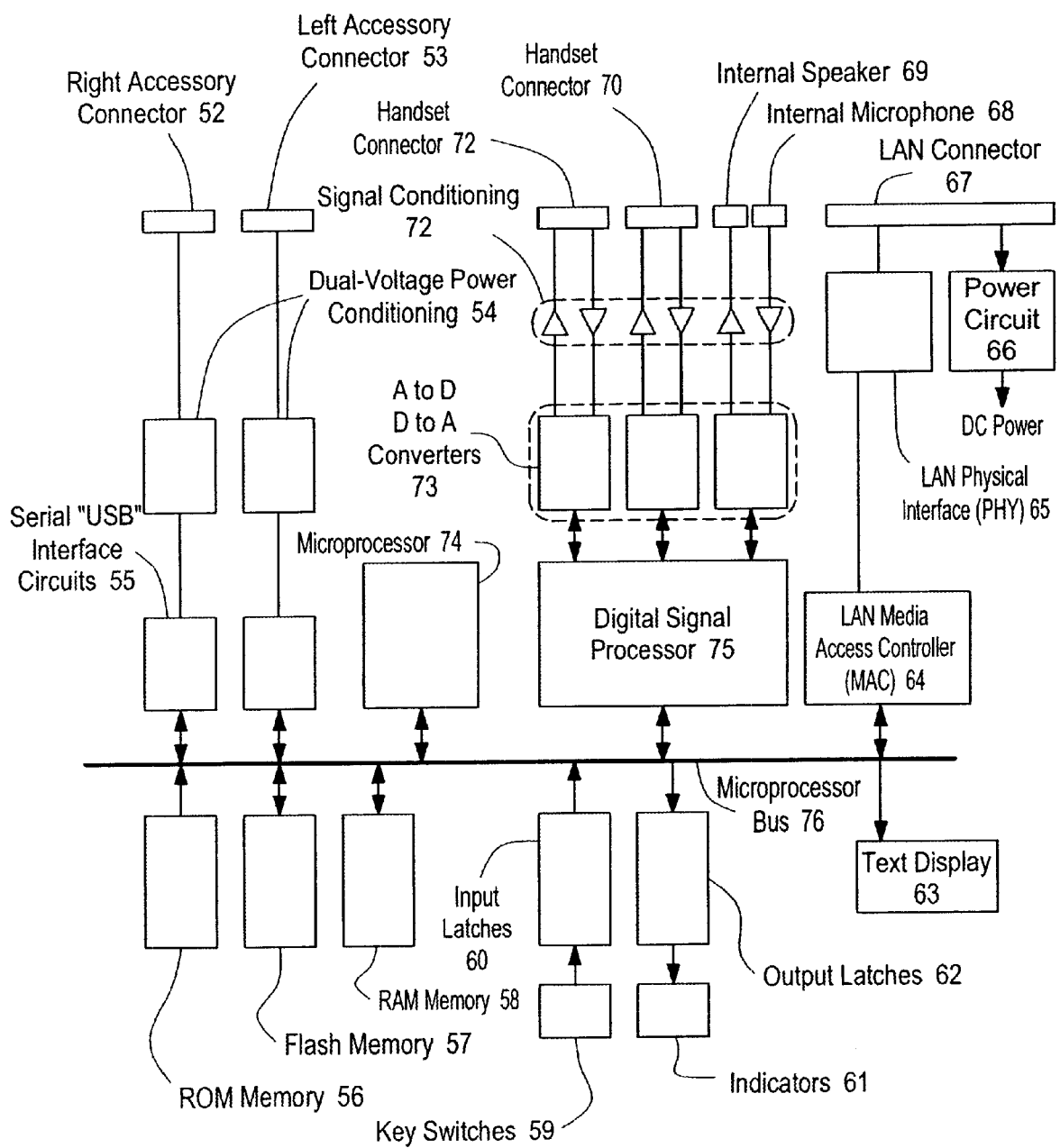
FIG. 5 depicts an illustrative internal block diagram for an embodiment of the disclosed LAN telephone.

The internal circuitry of an illustrative embodiment of the base unit 6 is shown in FIG. 5. The embodiment of the disclosed LAN telephone shown in FIG. 5 is implemented as a microprocessor based system. Specifically, a microprocessor 74 is shown attached to a parallel microprocessor bus 76, which provides an interface to various components via its address and data lines. In the embodiment of FIG. 5, the microprocessor 74 may, for example, be a Reduced Instruction Set Computer (RISC) processor, using a 16 bit wide data bus. The bus 76 is also connected to a Read Only Memory (ROM) 56, Flash Memory 57, and a Read And write Memory (RAM) 58. The bus 76 further connects to USB interface circuits 55, as well as input latches 60 and output latches 62. The bus 76 additionally connects to a LAN Media Access Controller 64, a text display 63 and a Digital Signal Processor (DSP) 75.

The organization of the hardware shown in FIG. 5 advantageously permits features of the disclosed LAN telephone to be implemented using control software. For example, the microprocessor 74 may use three types of memory to store such control software: ROM 56, Flash 57 and RAM 58. The ROM 56 may be used to store the microprocessor's basic initialization program. When the LAN telephone is powered on, usually by attachment to the powered LAN cable 1, the microprocessor 74 first executes a portion of its control code that is stored in the ROM 56. The control code program stored in the ROM 56 causes the microprocessor 74 to initialize all hardware peripherals of the LAN telephone, such as the MAC 64 and the output latches 62. The control code program stored in the ROM 56 further performs a self-test of the LAN telephone. The self test includes checking the microprocessor itself, testing the RAM 58 and performing a checksum verification of the contents of ROM 56 and the Flash memory 57. The ROM 56 also contains program code operable to load the Flash memory from the MAC 64.

One of the indicators 61, for example a light emitting diode (LED), is placed on the bottom of the LAN telephone, near the LAN connector. This LED indicator is attached to a flip-flop register that automatically resets itself on each power up, thus causing the LED indicator to turn on. As the microprocessor 74 finishes its self-test, it toggles the "set" line on the flip-flop register by activating a one bit port on the output latches 62. This action causes the LED indicator to turn off. In this way, the LAN telephone's main electronics module can indicate if it is functioning properly. The control code instructions stored in the ROM 56 may, in addition, also display an "OK" message in the text display 63. However, in the event that the text display 63 malfunctions, the LED indicator will still operate.

When the microprocessor 74 finishes executing the control program code stored in the ROM 56, it then executes control program code stored in the flash memory 57. The main body of the LAN telephone control program functionality is stored in the flash memory 57. Flash memory 57 is advantageously capable of having its contents updated or replaced. Through use of this capability of the flash memory 57, the LAN telephone can be loaded with new program code providing additional or modified functionality. Similarly, a fault or bug in the control program can be repaired, by storing a new program into the flash memory 57. If no program code is loaded in the flash memory 57, or if the program in the flash memory 57 does not yield a proper error check, then the microprocessor will enter an idle state. In this idle state, the microprocessor awaits a new control program to be downloaded into the LAN phone, for example from a LAN switch.

The RAM memory 58 is used for the storage of program variables and state information. The RAM 58 may have part or all of its memory protected via a "battery backup". In this way variable values can be maintained across a power failure.

During operation, the disclosed LAN telephone may communicate with other LAN telephones via the LAN to which it is attached. The LAN telephone uses the LAN MAC 64 to send and receive packets of data in Ethernet format. The LAN MAC 64 is connected to the LAN cable using a PHYsical interface (PHY) 65. The PHY 65 provides level and impedance translation, as well as other signal conditioning needed to send packets over a twisted pair wire. The PHY 65 is connected to the LAN Connector 67. The LAN Connector 67 may, for example, be a conventional "RJ" style connector (e.g. RJ-45). The PHY 65 uses two twisted pair wires within the cable bundle attached to the LAN Connector 67, one for transmit data and one for receive data.

In an illustrative embodiment, the disclosed LAN telephone obtains its operating power from the LAN cable 1 shown in FIG. 1, through the LAN Connector 67. This embodiment makes use of another, normally unused wire pair in the cable bundle to receive power, for example from a LAN switch. The received power is conditioned and voltage translated via the power circuit 66. This power circuit 66 is further described herein with reference to FIGS. 6 and 7.

The LAN telephone base unit 6, as shown in FIG. 1, includes a number of user buttons, shown for purposes of illustration as key switches 59 in FIG. 5. The key switches 59 may be operated by a user, in order to dial calls, and/or to access various features of the LAN telephone. The states of the key switches 59 are determined by the microprocessor 74 as it reads the contents of the input latches 60. The input latches 60 are connected to the key switches 59. In this way, more key switches can be accommodated, for a given number of input latch ports. The microprocessor 74 reads the key switches 59 periodically, for example, at times determined by an internal interrupt. The microprocessor 74 rejects spurious key transitions, only accepting those that are active for at least a minimum time.

LED indicators on the disclosed LAN telephone may be used to display call status. The microprocessor 74 may control the state of such indicators, as needed, via commands to the output latches 62.

The text display 63 in the embodiment of FIG. 5 may, for example, be a two-line Liquid Crystal Display (LCD). The text display 63 may receive power from a circuit card within the LAN telephone. The microprocessor 74 writes messages to the text display 63 to provide assistance to the user.

Accessories may be connected to the disclosed LAN telephone via a modified Universal Serial Bus (USB) interface. In the illustrative embodiment of FIG. 5, this interface is provided via USB controllers 55, which are connected to the bus 76. The microprocessor 74 may send and receive messages and commands to accessories via this modified USB interface. The USB Controllers 55 are connected to the left 53 and right 52 accessory connectors via a power conditioning circuit 54.

Connection to the handset 2 shown in FIG. 1 is made via the DSP 75 shown in FIG. 5. The DSP 75 is an integrated processor that is optimized for manipulating analog signals that are translated into digital form. The DSP 75 is connected to the bus 76. In the embodiment of FIG. 5, the DSP 75 includes an internal dual-port RAM, which is connected to a DSP core processor and to the bus 76. In this way, the DSP 75 may be issued commands and its control program loaded by the microprocessor 74, out of the flash memory 57, over the bus 76. In the embodiment shown in FIG. 5, the DSP 75 also includes an internal ROM, which can contain a basic "Boot" program for the DSP. After initialization, the DSP 75 provides a message, via its dual-port memory, to the microprocessor 74, indicating that the DSP 75 is ready to accept its control program. The control program of the DSP 75 is loaded into DSP memory, by the microprocessor 74, prior to the LAN telephone entering a "Ready" state. In the Ready state, the LAN telephone is ready to accept and place telephone calls.

The DSP 75 is further shown connected to the analog inputs and outputs via Analog to Digital (A to D) and Digital to Analog (D to A) converters 73. The converters 73 translate the analog, voltage-based signal into a digital signal. In the embodiment shown in FIG. 5, the A to D and D to A converters 73 are combined into one package, providing two-way translation. The handset 2 (FIG. 1), and a headset (not shown), are connected to the base unit via the handset connector 71 and headset connector 70 shown in FIG. 5. The internal speaker 69 and internal microphone 68 shown in FIG. 5 are directly connected to the DSP 75 via a signal conditioning element 72. The signal conditioning element 72 also provides an interface to the handset connector 71 and the headset connectors 70. The signal conditioning element 72 provides signal limiting, gain or attenuation, filtering, and power, as needed.

To initiate or receive telephone calls, the LAN telephone receives control messages from a switch or telephone server, via the LAN to which it is connected. These messages and associated responses are used to initiate telephony sessions. For example, when a call is in progress, speech audio is received by the microphone of the handset 2, and conveyed through signal conditioning element 72 and converter 73 to the DSP 75. The speech audio is thus sampled and converted into a stream of digital numbers ("samples") by the A-D functionality of the converters 73. Each such number represents the voltage of the received microphone speech signal. The DSP 75 then places these samples in its internal RAM and signals the microprocessor 74 when an appropriate number of samples are ready for processing. At this point, the microprocessor 74 reads the samples, places them into a packet format consistent with a LAN protocol and the IP (Internet Protocol) protocol, and sends this resulting packet to the LAN switch, via the MAC 64. The resulting packet may, for example, be what is referred to as an "IP over Ethernet" format packet. The DSP 75 may also employ a "compression" algorithm, whereby the number of speech signal samples conveyed to the switch may be reduced. In such an embodiment, as a result of the compression, the microprocessor 74 will have a smaller set of data items to transmit to the distant telephone. Various specific conventional compression algorithms may be employed in this regard. The effectiveness of a given compression algorithm is usually inversely proportional to the quality of the resulting speech, after it is "de-compressed" by the distant telephone. While the microprocessor 74 is accepting speech sample data from the DSP 75 and sending it to the distant telephone via the MAC 64 and LAN switch, it simultaneously must perform the receive function. That is, the microprocessor 74 simultaneously processes received data packets, from the distant telephone, via the LAN switch and the MAC 64. These received packets contain voice data from the distant telephone. The microprocessor 74 accepts these packets, extracts the voice data contained therein, and then transfers the extracted voice data to the DSP 75. The DSP 75 then takes the voice samples, decompresses them if necessary, and provides them to the converter 73, for output to the handset 2 through the handset connector 71. The receive process and transmit process provided through the microprocessor 74 must operate simultaneously, so that voice samples are accepted from and delivered to the A-to-D and D-to-A functions of the converters 73 on time. Normal, uncompressed telephony voice uses a sample rate of 8 kilo-hertz. Thus, the DSP 75 must receive one sample and output one sample every 125 microseconds, in order to support normal telephone speech.

As mentioned above, prior attempts at implementing a LAN telephone have encountered problems with packet contention. Packet contention may result when packets from other LAN users can be transmitted simultaneously with voice packets, potentially causing interference with the voice packets. Under such circumstances, voice packets may even be lost, causing an audible break in the received speech. In the disclosed LAN telephone this problem is avoided through operation with the disclosed LAN switch, which has extended capability to handle packets with "real-time" delivery needs. The disclosed LAN telephone incorporates a system for transmitting speech data packets such that they will not interfere with packets from other real-time devices on the network.

The disclosed system includes what is referred to herein as "packet scheduling", and the technology upon which it is based is referred to as "Time Based Routing" or "TBR." In the disclosed system, the LAN switch maintains time synchronization with the LAN telephone via the transmission of a framing message referred to as a "heartbeat packet". The heartbeat packet is used to "lock" the LAN telephone's internal clock to an internal clock of the switch. In this way all LAN telephones in the system (as well as other real-time devices) are able to maintain synchronization with one another. With system wide synchronization thus established, the LAN telephones can operate in connection with schedules which define the reception and transmission of real-time packets.

FIGS. 4a–4d illustrate schedule assignment for two of the disclosed LAN telephones, which may also be referred to as "IP phones", and which share the same circuit path. The disclosed scheduling system is based on the occurrence of schedules. Schedules are expected time periods during which packet transmissions and/or receptions for one or more packet flows. Schedules occur independently at each switch within the network. A given schedule may apply to the transmit and receive functions of all ports within a switch, or to a subset of the transmit and/or receive functions of one or more ports within a switch. Accordingly, a given switch may operate based on a single schedule, or on multiple schedules Schedules may be repeated continuously. Alternatively, each schedule may be triggered explicitly in response to a trigger event, as further described below.

Figure 4A:
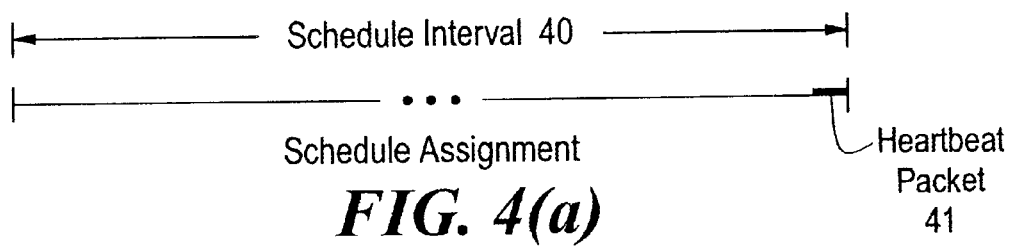
FIGS. 4a–4d show schedule assignment for two of the disclosed LAN phones sharing the same circuit path.

An illustrative schedule interval 40 is shown in FIG. 4(a). Within a schedule interval, packet flow offsets define the beginnings of packets or packet groups associated with packet flows. Packet flows define sets of packets associated with real-time applications, such as would be used to establish a telephone call or session. Accordingly, a packet flow associated with a telephone call or session may be identified by some set of packet header field values that are common to all packets within that packet flow.

Packet flows are typically unidirectional, and accordingly may be associated with either the transmit or receive function of a switch or telephone instrument. In the case where a packet flow offset is associated with a transmit function, that packet flow offset defines a time within a schedule interval at which transmission of one or more packets for the associated packet flow may be initiated. In the case where a packet flow offset is associated with a receive function, that packet flow offset defines a point in time within a schedule interval at which reception of one or more packets for the associated packet flow may be expected.

For a given packet flow, different packet flow offsets are established for each switch along the path between a first telephone instrument and a second telephone instrument. The set of offset values associated with a packet flow for all switches along such a path defines a schedule for that packet flow (also referred to as a "packet flow schedule"). A packet flow schedule may also include a schedule interval duration and packet length. A time period within the schedule interval associated with a given packet flow schedule is referred to as the packet flow schedule period.

As shown in FIG. 4(a), the beginning and/or the end of the schedule interval 40 is defined by the heartbeat packet 41. For example, at the end of the schedule interval 40, the LAN switch may transmit a heartbeat 41 to all of its ports. In an illustrative embodiment, the heartbeat packet 41 is timed to conclude just as the next schedule interval commences. Thus the heartbeat packet 41, when received, allows the disclosed LAN telephone to synchronize its internal clock and schedule interval with the LAN switch. When the LAN telephone establishes a telephone session, it obtains schedule information from a call agent, which is implemented as software executing on a server system, for example attached to or co-existing with the LAN switch. The call agent is operable to communicate with the switch and negotiate schedules for real-time packet traffic.

After a schedule is established, the call agent sends the relevant schedule information to the LAN telephone. The LAN telephone is then permitted to send telephone voice packets, one or more together in each burst, at regular intervals. These packets are transmitted in accordance with the schedule information given to the LAN Telephone by the call agent. By transmitting the packets only in accordance with the schedule information provided by the call agent, contention between LAN telephones is eliminated. The call agent thus assigns different schedules for each LAN telephone session traversing a common circuit path.

Figure 4B:
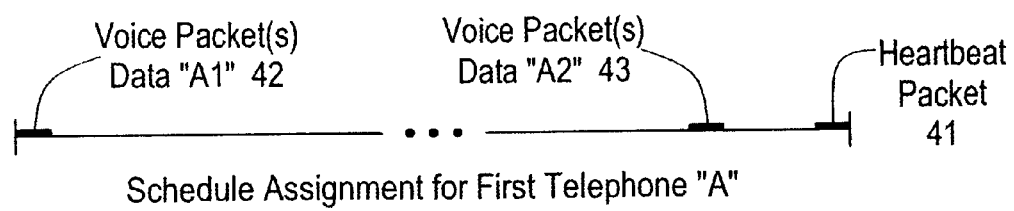

FIG. 4(b) shows a schedule assignment for a first LAN telephone session with respect to a schedule interval within a first LAN telephone. As part of establishing a packet flow schedule for the telephone session, the call agent has assigned a first packet flow offset for the first LAN telephone that defines the voice packet data transmission 42, as well as a second packet flow offset defining the voice packet data transmission 43. Thus the voice data packets from a first LAN telephone "A" are actually transmitted in accordance with the first packet flow offset and second packet flow offset, as shown by the voice packet(s) data "A1" 42 and "A2" 43 in FIG. 4(b). For purposes of illustration, the first LAN telephone "A" is transmitting telephone voice data in an uncompressed format, that is, at 8 thousand samples per second.

Figure 4C:
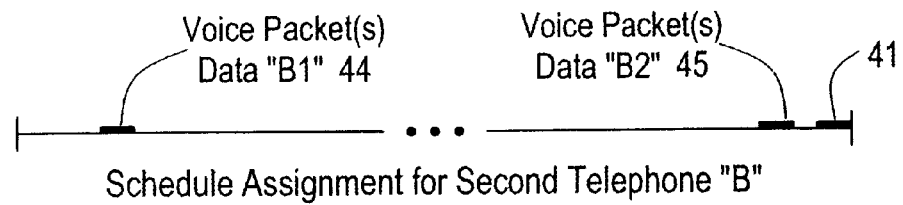

In FIG. 4(c) a schedule interval for transmission of data is shown for a second LAN Telephone "B". As shown in FIG. 4(c), the call agent has assigned LAN telephone "B" different packet flow offsets within the schedule interval from those assigned to LAN telephone "A". It is not necessary for the LAN switch, or call agent to always assign different packet flow offsets to different LAN telephones. This is only necessary when multiple LAN telephones require a session which must traverse a common circuit. In the example shown in FIGS. 4(a)–4(d), LAN telephones "A" and "B" both communicate with the WAN link. Thus, different packet flow offsets are needed. The call agent has assigned LAN Telephone "B" packet flow offsets resulting in transmission of voice packet(s) data B1 44 and voice packet(s) data B2. Because schedule intervals are defined on a per port basis with respect to the LAN switch, and the LAN telephone "A" and LAN telephone "B" are connected to the LAN switch via different ports, LAN telephone "A" 's packet data is not seen on LAN Telephone "B"'s schedule interval, and vice versa.

Figure 4D:
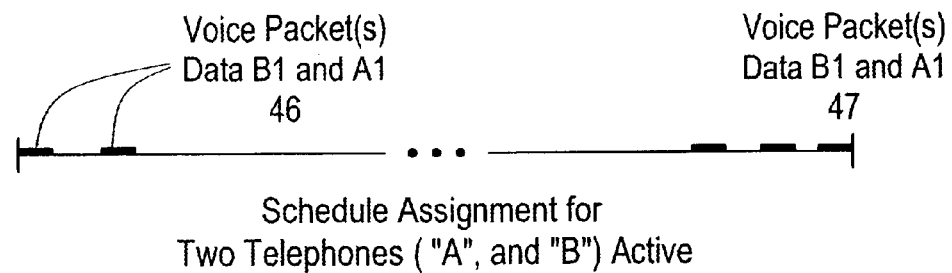

FIG. 4(d) shows the transmission schedule interval for the LAN switch port connected to the WAN interface. Because the sessions for LAN telephone "A" and the LAN telephone "B" pass through the WAN interface, the LAN switch must provide voice data from both LAN telephone "A" and LAN telephone "B" to the WAN Server. Because LAN telephone "A" and LAN telephone "B" have individually assigned packet flow offsets that do not conflict, there is never a situation when the voice packet traffic from one LAN telephone interferes with that from another LAN telephone.

It should be noted that internal to the LAN switch, the handling of LAN traffic is absolute. This means that for a given packet flow offset within a given schedule interval, the switch can "set" the connection. All other traffic destined for a port, at the time of the packet flow offset, must be queued and sent after the scheduled packet flow has concluded. This has two principal benefits: (1) the switch prevents any other network traffic from interfering with the LAN telephone traffic, and (2) the switch is able to handle a great deal more traffic, for any given amount of packet processing bandwidth. The latter benefit also means that much larger switches can be built, than would otherwise be possible.

When the predetermined amount of data that is to be transmitted at a given packet flow offset has been completely transmitted, if there is no other scheduled data to be transmitted, other unscheduled traffic may be transmitted. For example, if the amount of data to be transmitted at a given packet flow offset is defined in terms of a number of packets, then the switch will count such packets as they are transmitted. When the last packet has traversed the switch, the LAN switch opens the relevant circuit for any other packet traffic that may be queued for the particular destination port. The switch may also allow new packets to enter the switch and be routed in the normal fashion, if such actions would not interfere with other scheduled traffic.

In one embodiment, the disclosed LAN telephone receives it power from the LAN cabling to which it is attached. LAN cables typically have four, individual twisted pair wires per station cable. One pair is used for transmit data, received by the LAN telephone from the LAN switch. Another pair is used for receive data, transmitted from the LAN telephone to the LAN Switch. Two other pairs are often unused or reserved for future expansion. In one embodiment of the disclosed LAN telephone, the unused pairs are doubled up, and used to send power to the LAN telephone instrument, from the switch, or from a power source co-located with the switch. In this way, the disclosed LAN telephone does not need to have an additional power supply, with inconvenient cords. In addition, multiple LAN telephones may be operated by a single supply, which can have battery-backup and thus provide power in the event of a power failure.

Figure 6:
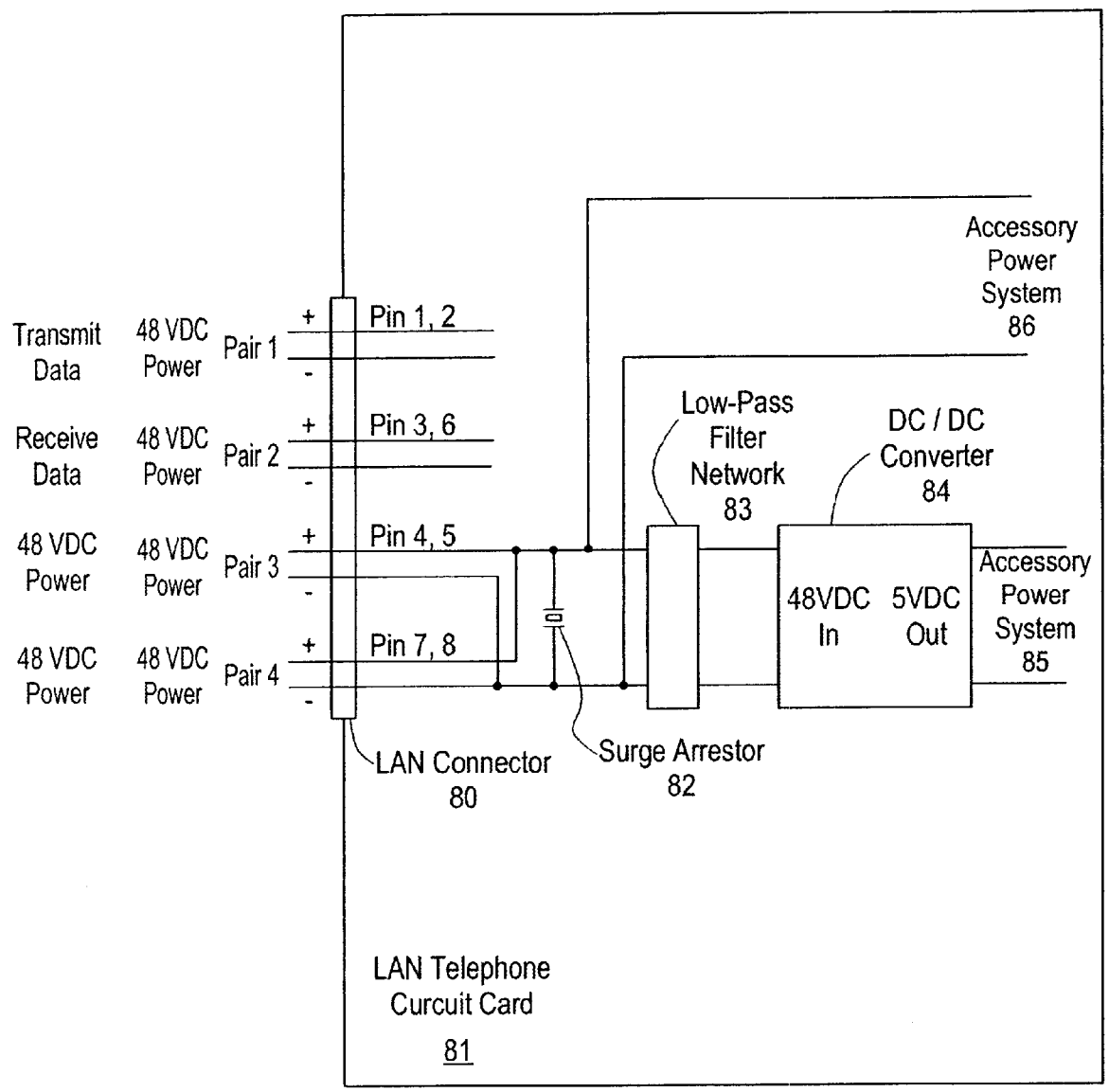
FIG. 6 depicts an illustrative schematic diagram showing an external power system for an embodiment of the disclosed LAN telephone.

An illustrative embodiment of the disclosed LAN telephone power supply system is shown in FIG. 6. The data signals and power come into the telephone circuit card 81 via the LAN Connector 80. In a typical LAN installation, twisted pairs 1 and 2 are used for data, leaving pairs 3 and 4 free for power. In the embodiment of FIG. 6, the power is delivered as 48 VDC. Alternatively, the delivered power could be other voltages, or even AC. However, in some embodiments, 48 VDC is most convenient. The voltage is high so that the current required is as low as possible, for a given power level, since P=I*V where P=Power, I=Current, and V=Voltage. Typical LAN cable is 24 gauge (AWG) which has a limited current handling capability. At 48 VDC, such conventional cable could deliver a maximum of 24 watts at 500 milliamps of current. Since the power cable is doubled up, it is actually possible to double the power delivered, to 48 Watts. This is more than enough to operate the LAN telephone and attached accessories.

As the power enters the LAN telephone circuit card 81, it connects first to a surge arrestor 82. This device, or combination of devices, is used to prevent stray surges from damaging the LAN telephone or propagating to the accessories. The power is then buffered via a low-pass filter network 83. The network 83 is commonly used to filter out any signals, such as data signals, which may have coupled to the power lines. Finally, the power is connected to a 48 VDC to 5 VDC power supply 84, of the DC—DC converter type. The power supply 84 is used to provide the proper supply voltages to the LAN telephone. These voltages include, for example, 5 VDC and 3.3 VDC, and may include others as well. The DC—DC converter 84 is a switching device, which may transfer nearly all of the input power for use by the LAN Telephone. Further in an illustrative embodiment, the input 48 VDC may also be provided to the accessory power system, after suppression of any surges.

The disclosed LAN telephone, unlike most other telephones, is capable of supporting a variety of accessories. These accessories include an operator console and an external speakerphone unit. The accessory system is designed for future expansion. In order to facilitate the expansion selection, the LAN telephone uses the Universal Serial Bus (USB) to communicate with the accessories. USB is a relatively simple, fast (1.5 to 480 megabits per second), and standardized bus used for computer devices. In contrast, the disclosed LAN telephone uses a modified USB for interconnection of telephone accessories to the disclosed LAN telephone. One difficulty with the existing USB is that it has only a limited capability to provide power to a connected device. As it is generally known, USB has two wires in the cable, which supply 5 VDC. Current is limited to 0.5 Amp. Additionally, any given device can only use 0.1 Amp. USB allows devices to be chained, so all chained devices must share the same power. This means that the maximum power available is 2.5 Watts, with 0.5 Watt for each device. This is too little for many potential devices. For instance, a typical LED indicator uses 20 milli-Amps. Accordingly, an accessory using the existing USB could have five LEDs, and nothing else. The operator console 7 of FIG. 1, could easily have 20 or even 100 such LEDs, and require other power as well. Moreover, a speaker phone unit could easily exceed the 2.5 Watt maximum, even if it used all of the USB power. For this reason the disclosed LAN telephone provides a unique, dual-voltage accessory power system. The disclosed dual-voltage accessory power system allows the LAN telephone to alternatively supply power at 48 VDC, instead of 5 VDC, thus increasing the power consumption by a factor of 10.

Figure 7A:
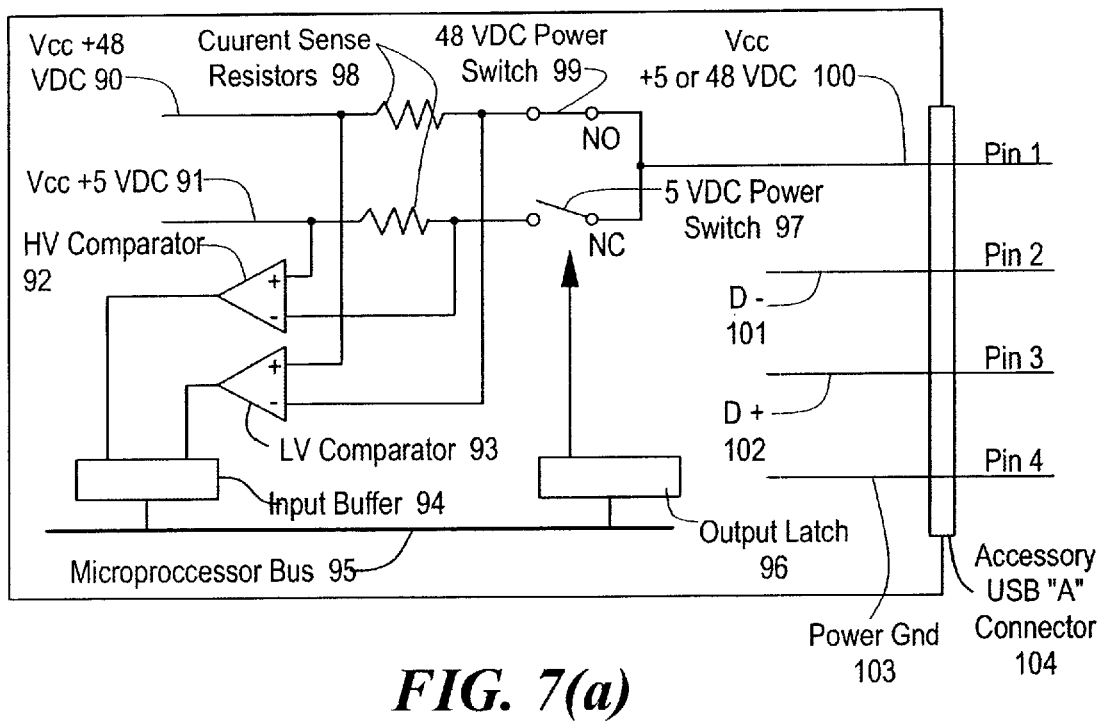
FIGS. 7(a) and 7(b) show an illustrative schematic diagram for an accessory power system and interface system.
Figure 7B:
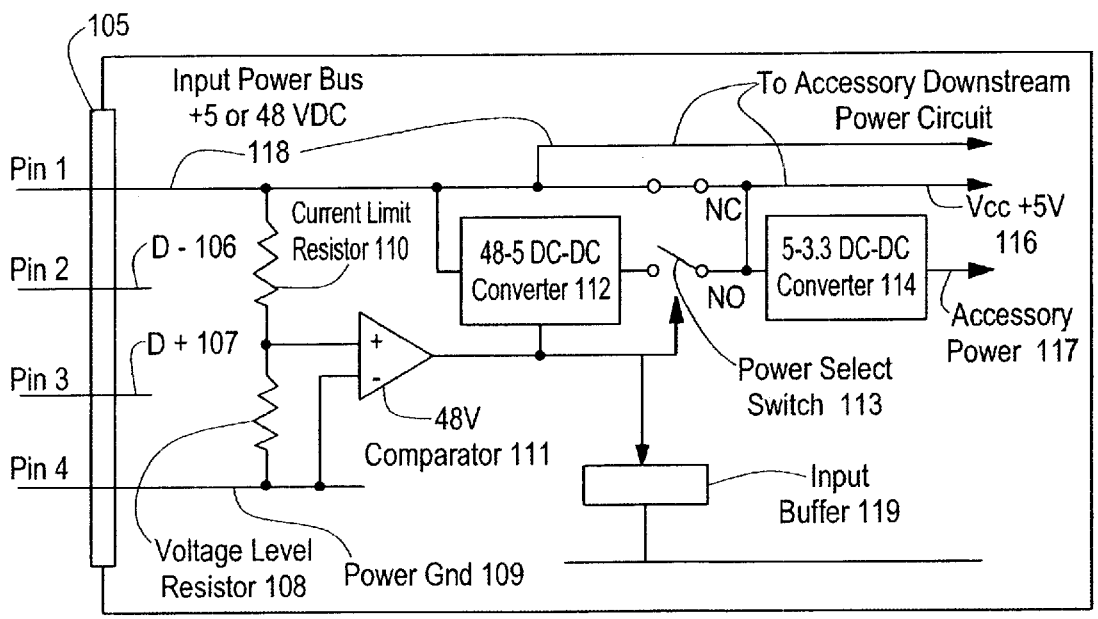

An embodiment of the disclosed LAN telephone accessory power system is depicted in FIG. 7(*a*) and FIG. 7(*b*). In FIG. 7(*a*) is shown a source power system. The source power system of FIG. 7(*a*) is used to provide power to the accessory. FIG. 7(*b*) depicts an illustrative embodiment of the accessory internal power system. The accessory internal power system receives and converts the power from the source power system, which, for example, is contained within the LAN telephone. The source power is provided by the base unit 6 to the accessory unit via an accessory connector 104, which is shown for purposes of illustration as a USB "A" connector. The connector 104 includes four wires. Two wires are used for power, specifically power pin 1 100 and ground pin 4 103. Two other pins are used for data transfers, specifically pin 2 101 and pin 3 102. Power is supplied on pin 1 100 of the connector 104 at either 5 VDC or at 48 VDC. In the illustrative embodiment of FIG. 7(*a*), the selection of supply voltage is made by the base unit microprocessor 74. The microprocessor 74 sets an appropriate bit in the output latch 96 to select the proper power supply voltage. For example, the necessary power switch or switches may be implemented as a Double Pole Single Throw or a Double Pole Double Throw with MOSFET (Metal Oxide Semiconductor Field Effect Transistor).

During operation of the source power system shown in FIG. 7(*a*), default power setting is normally 5 VDC. When an accessory is connected, the accessory is queried by the base unit microprocessor 74, via the USB interface 55, to determine if the accessory uses 48 VDC. Such a query may, for example, be provided to the accessory over the data lines of the modified USB interface. A 48 VDC-capable accessory will respond to such a query in the affirmative. If the microprocessor 74 determines that the accessory uses 48 VDC, then the microprocessor 74 switches the voltage to 48 VDC. The 48 VDC is available from the station input power 86. The 5 VDC power is available from the base unit's power converter 84.

The base unit microprocessor 74 monitors the power usage by accessories connected to the base unit. It accomplishes this via a monitoring system. Low value, current sense resistors 98 are connected in series with the 48 VDC and the 5 VDC power lines. A voltage differential is formed across the resistors 98, as current passes through. When an accessory is connected, a minimum current is passed, causing a small but measureable voltage to be present at the input of the HV and LV comparators 92 and 93. The purpose of this circuit is to determine if the USB device is connected. In the illustrative embodiment of FIG. 7(*a*), the current threshold is 10 milli-amps. The output of the two comparators is connected to the input buffer 94. The microprocessor 74 reads the input buffer 94 periodically, to determine if the accessory device is still connected. If the microprocessor 74 determines that the accessory device has been disconnected, then the microprocessor automatically resets the power switch 97 to 5 VDC operation. This action will prevent damage to a non-48 VDC capable USB device. Two comparators and two current sense resistors are required because the minimum currents will be different through each.

An illustrative embodiment of the disclosed accessory power system is shown in FIG. 7(*b*). The system of FIG. 7(*b*) allows the accessory to automatically switch from the low-power to high-power modes. Power enters the accessory via a standard USB "B" connector 105. The plus 5 VDC is present on pin 1 118, and the Power ground return is on Pin 4 109. The current limit 110 and voltage level 108 resistors are connected across the power 118 and ground 109 lines. The voltage developed across the voltage level resistor 108 is connected to the 48 VDC comparator 111. If the comparator 111 senses that the voltage has exceeded the 5.5 VDC limit for USB, then it provides a control signal to the power select switch 113 and the 48 VDC to 5V DC DC—DC Converter 112. Accessory Power is 3.3 VDC, normally provided by the 5 VDC to 3.3 VDC Power Converter 114. The converter 114 can also be implemented as a shunt converter, if the power drain is low. This converter 114 derives its input power from either the input power bus 118 or the 48 VDC to 5 VDC converter 112. The power select switch 113 may be implemented as a Double Pole Single Throw (DPST) switch, similar the power switch in the source power system 97. If the voltage is 5 VDC, the 5 VDC to 3.3 VDC Converter 114 receives its power from the Input Power Bus 118. If the power voltage is higher than 5 VDC, then the converter 114 receives its input power from the 48 VDC to 5 VDC Power Converter 112. The accessory microprocessor 124 monitors the input buffer 119 to determine if 48 VDC is available. If 48 VDC is present, then the accessory microprocessor 124 can enable functions that require higher power. Power is provided to the accessory downstream power circuit. The accessory downstream power circuit includes 48 VDC, if available or 5 VDC. The accessory downstream power circuit can then provide power to another accessory, "daisy-chained" from the first accessory.

Figure 8:
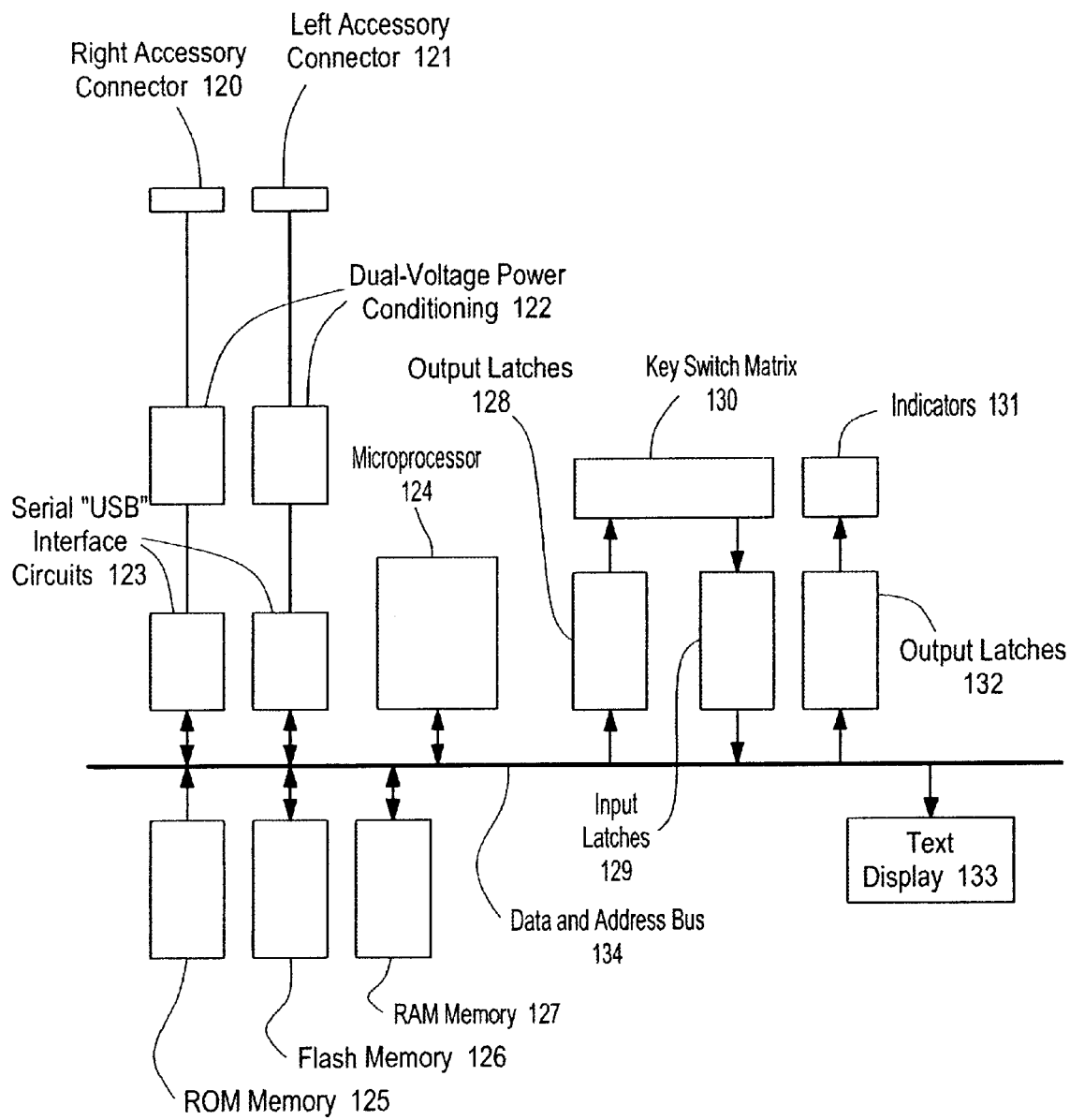
FIG. 8 shows an illustrative block diagram of an operator console accessory unit.

An embodiment of the LAN Telephone Operator Console is illustrated in FIG. 8. The console of FIG. 8 includes, for example, 100 small buttons and 100 LED indicators. The console of FIG. 8 allows the user (usually an operator) to monitor the status of up to 100 extensions. A smaller, alternative accessory console embodiment may, for example, support up to 20 extensions. LEDs are individually associated with each button and each extension. An "on" LED indicates that the line is busy. The operator may transfer a call directly by pressing the button associated with the extension, while a current call is connected. The calling party will then be connected to the extension. The console accessory of FIG. 8 is an example of a device that generally needs more power than 0.5 Watts.

FIG. 8 shows an internal block diagram of an operator console accessory. The console of FIG. 8 is controlled via a microprocessor 124. The microprocessor 124 is connected to a data and address bus 134, which is used to control and access all of the keys and switches. The microprocessor 124 connects with the USB Interfaces 123. One of the USB Interfaces 123 is used for "Upstream" communications, to the base unit, and another one is used for "Downstream"

communications, to additional accessories. Both USB interfaces have power conditioning circuits 122, whose operation has been described above in connection with FIG. 7(b). The circuits 122 allow the accessory to derive additional power over the USB interface, with no additional cables or connectors.

The microprocessor 124 also connects to output latches 128 and input latches 129 to enable the unit to read the status of all the buttons. The key switch matrix 130 is read by enabling rows of switches, via output latches 126, and reading the rows with the input latches 129. The indicators 131 are operated by setting the corresponding bits in the output latches 132. For the operator console, there is one bit for each LED indicator. An optional text display 133 is also connected to the data and address Bus 134. The text display 133 is used to present operator-specific messages to an operator. The design and architecture of the operator console FIG. 8 is further illustrative of other possible accessory designs.

Figure 9A:
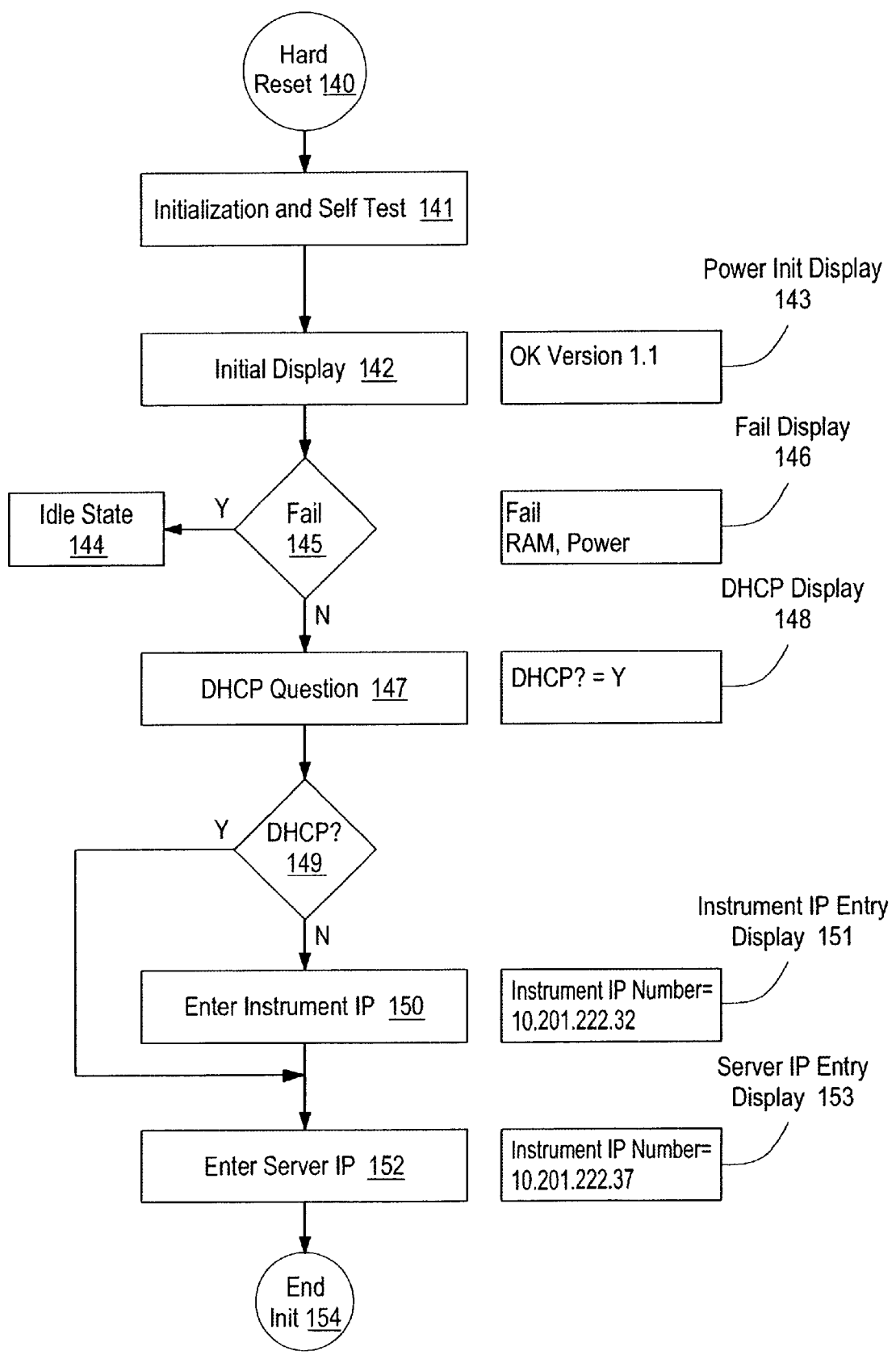

FIG. 9 illustrates the disclosed LAN telephone's system for automatic registration with a LAN switch and a call agent. The disclosed system allows the LAN telephone to be moved from one LAN circuit cable or switch port to another, without changing the switch configuration. The disclosed system works by recognizing the specific LAN telephone's serial number, using that serial number to link to a database, and then "learning" the path to the LAN telephone. This process is performed in the call agent and in the LAN Telephone itself. In FIG. 9(a) is shown the set-up process to ready the LAN Telephone for regular use. The process shown in FIG. 9(a) may be initiated at any time by a "hard" reset of the device. This reset may be accomplished by pressing a partially concealed reset button on the bottom of the telephone base unit 6. FIG. 9(a) shows a software flow-chart of the telephone configuration procedure. The telephone enters the procedure via a hard reset 140. Upon receiving the reset 140, the telephone executes an initialization and self-test program at step 141. During the initialization and self-test program, all of the latches and interfaces of the device are reset and properly configured. Also, the microprocessor 74, and memories 56, 57 and 58 are tested, along with the DSP 75. If the initialization and self-test performed at step 141 complete successfully, then the LAN telephone will display the current revision level of the control program, stored in flash memory 57, along with an "OK" message, as shown in the power init display 143 of FIG. 9(a). If the program executed at step 141 does not complete successfully, then the display will show "Fail" message, along with some indication as to the nature of the failure, as shown by the fail display 146 of FIG. 9(a). A fail determination at step 145 will also cause the telephone to enter an idle state 144.

If the initialization and self-test program executed at step 141 is successful, then at step 147 the telephone will prompt the user with a DHCP (Dynamic Host Configuration Protocol) query, as shown by the DHCP display 148 in FIG. 9(a). DHCP is often used in LAN IP-based networks to ease the burden of IP number assignment. The administrator may then choose DHCP="y" or "N". An input of "Y" will cause the telephone to prompt the user for DHCP information (not shown). An "N" response will cause the telephone to prompt the user to enter the assigned IP number for the LAN telephone at step 150, and as illustrated in the instrument IP entry display 151. When this process is complete, at step 152, the telephone will prompt the user for the Server IP number, as illustrated by the server IP entry display 153. This number is the IP address of the call agent server, to which the LAN telephone will direct and accept call requests. When the server IP number is entered, then the "Hard Initialization" phase is ended at step 154.

Figure 9B:
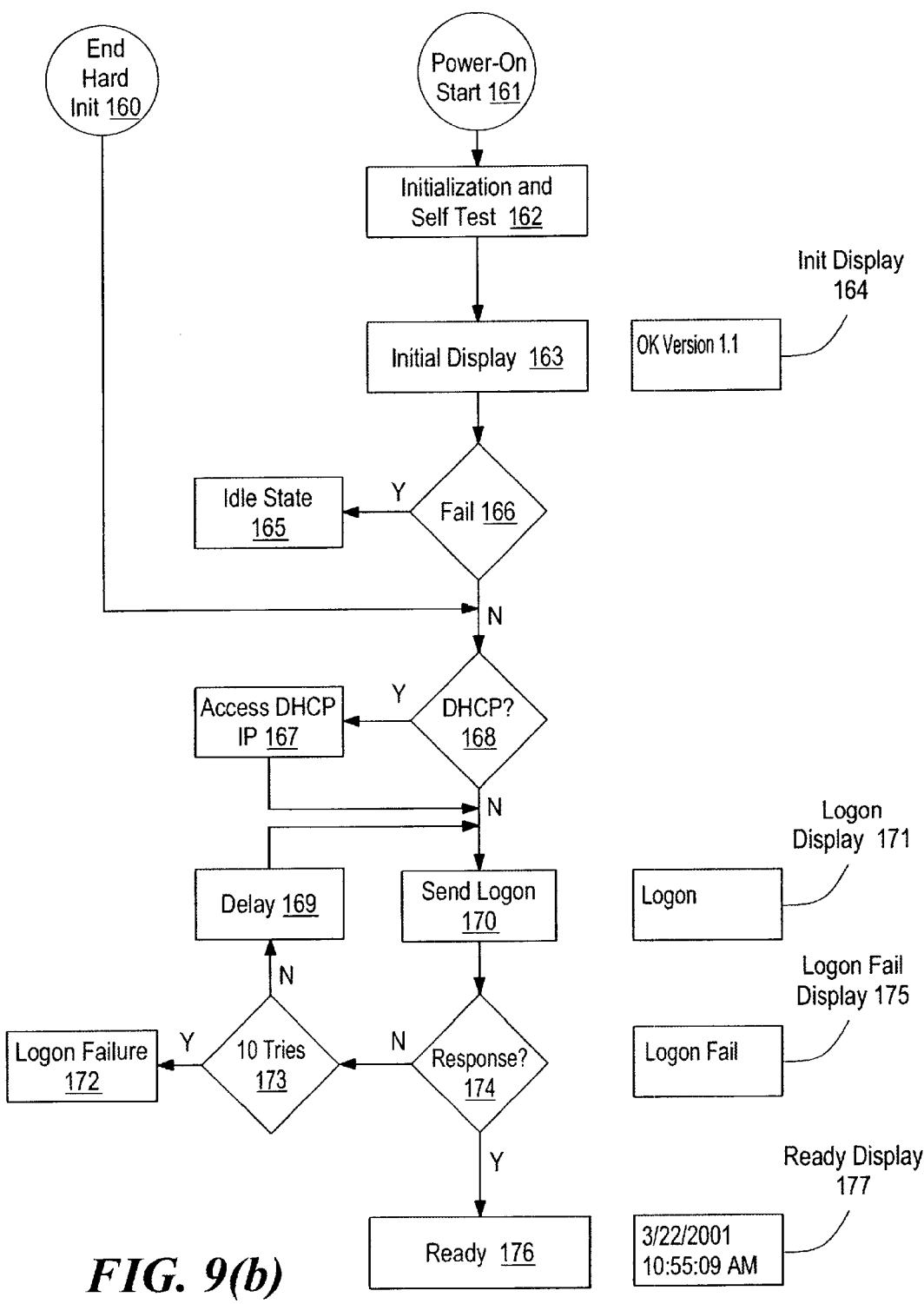

FIG. 9(b) shows the series of steps, and associated displays, by which the disclosed LAN telephone identifies itself to a call agent. The process of FIG. 9(b) is entered either via the successful completion of a hard init 160, or via a power-on reset 161. In the case of a power-on reset 161, the LAN telephone has just been connected to the LAN network, or the system power has just been restored, after a complete power failure. When a user moves a telephone from one location to another, the power-on reset 161 is activated. The first step is to complete an initialization and self-test at step 162, which is essentially the same as performed at step 141 of FIG. 9(a) for the hard reset 140. An initial display is provided at step 163, as illustrated by init display 164. This has the same result as before. If the LAN telephone does not fail initialization and self test, as determined at step 166, then the network registration process begins. Otherwise, if the LAN telephone does fail initialization and self test, then an idle state 165 is entered.

The LAN telephone checks to see if it is configured for DHCP operation at step 168. As it is generally known, DHCP (Dynamic Host Configuration Protocol) is a protocol that lets network administrators manage centrally and automate the assignment of Internet Protocol (IP) addresses in an organization's network. If the LAN telephone is configured for DHCP operation, then the telephone must access an IP address from the DHCP Server at step 167, so that it can begin the logon process. If the telephone already has its IP address assigned, then it proceeds directly to logon step 170. During the logon process performed at step 170, the telephone displays the state and success status of the process as illustrated by logon display 171. First, a logon message is sent to the call agent at step 170, at the call agent's assigned IP address. The telephone determines at step 174 whether a positive response is received from the call agent. If the telephone does not receive a positive response, then it waits a delay of random length at step 169, and returns to step 170. This process will repeat for a limited number of times, in this case, ten times. At step 173, the telephone determines whether the logon has been attempted the maximum number of times permitted before a failure is reported. If the logon attempt is unsuccessful then the telephone displays a logon failure display 175 and enters an idle state. If the logon attempt succeeds, then the telephone enters the "Ready" state at step 176, and displays the normal ready display 177, which typically contains the date and time. The telephone is now ready to make and receive calls.

The call agent program maintains a database, which contains a number of user records, each of which is keyed to the serial number of a LAN telephone. One of the user records in the database is keyed to the serial number of the illustrative LAN telephone whose operation is described in connection with the steps shown in FIG. 9(b). When the logon request is sent at step 170 of FIG. 9(b), the serial number of the LAN telephone is included in the request, and allows the call agent to determine a user name that is associated with the serial number in the database, accordingly identify the telephone user and call parameters. Such call parameters may, for example, include an associated telephone number, user name, Ethernet MAC (Media Access Control) address, serial number, and/or IP (Internet Protocol) address. By referencing the user name with the serial number, the disclosed system makes it possible to conduct a logon of a LAN phone from anywhere in the network, and as a result adapt the call agent to recognize the extension of that LAN telephone, regardless of where it is located physically.

In order to create the database, an entry field program automatically assists a system administrator in configuring the LAN telephone. To initialize a LAN telephone, the administrator runs an initialization program. Then, when a telephone is hard reset, as in step 140 of FIG. 9(*a*), the contents of an administrator record from the database, for that telephone, is displayed on the screen. An illustrative administrator record 180 is shown in FIG. 9(*c*). The contents of database fields for name and extension number can then be modified or reentered. Subsequently, the new or modified record, for that telephone instrument, is ready for use.

Other database records, which may be useful to an administrator, may also be provided in an embodiment of the disclosed system. For example, a specific LAN telephone's physical location may be traced, to the office and wall jack, via a location record, such as the illustrative location record 181 of FIG. 9(*d*). The Location Record 181 displays the location of every LAN telephone, within a network served by a call agent.

In an illustrative embodiment, the disclosed LAN Telephone may include the ability to accept a new control program. This capability is import to allow for future upgrades to the telephone instrument's functions. The upgrade is accomplished by sending a new object program code image to each telephone instrument. Such a change in program code must be accomplished with a trusted procedure. Otherwise, the telephone could loose its ability to receive new code, and could further be rendered inoperable. The disclosed LAN telephone may accomplish such a code change by segregating the code into three pieces. For example, a first piece including modules referred to as Init and Com Load may be stored in the ROM 56. These modules are highly tested, designed to support the hardware initialization, and to reliably down load a new control program a call agent. During a code update, the actual control program for the LAN telephone may be temporarily stored, one segment at a time, within the RAM 58, as it is received. Each segment is then loaded into the Flash Memory 57. The control program is then entered, after the initialization sequence is completed, as described above in connection with FIG. 9(*b*). By storing the Init and Com Load modules in ROM 56, and placing only the control program in Flash Memory 57, no failure of the program load process can prevent the LAN Telephone from retrying the program load. In this way, no failure will permanently disable the LAN Telephone.

Figure 10:
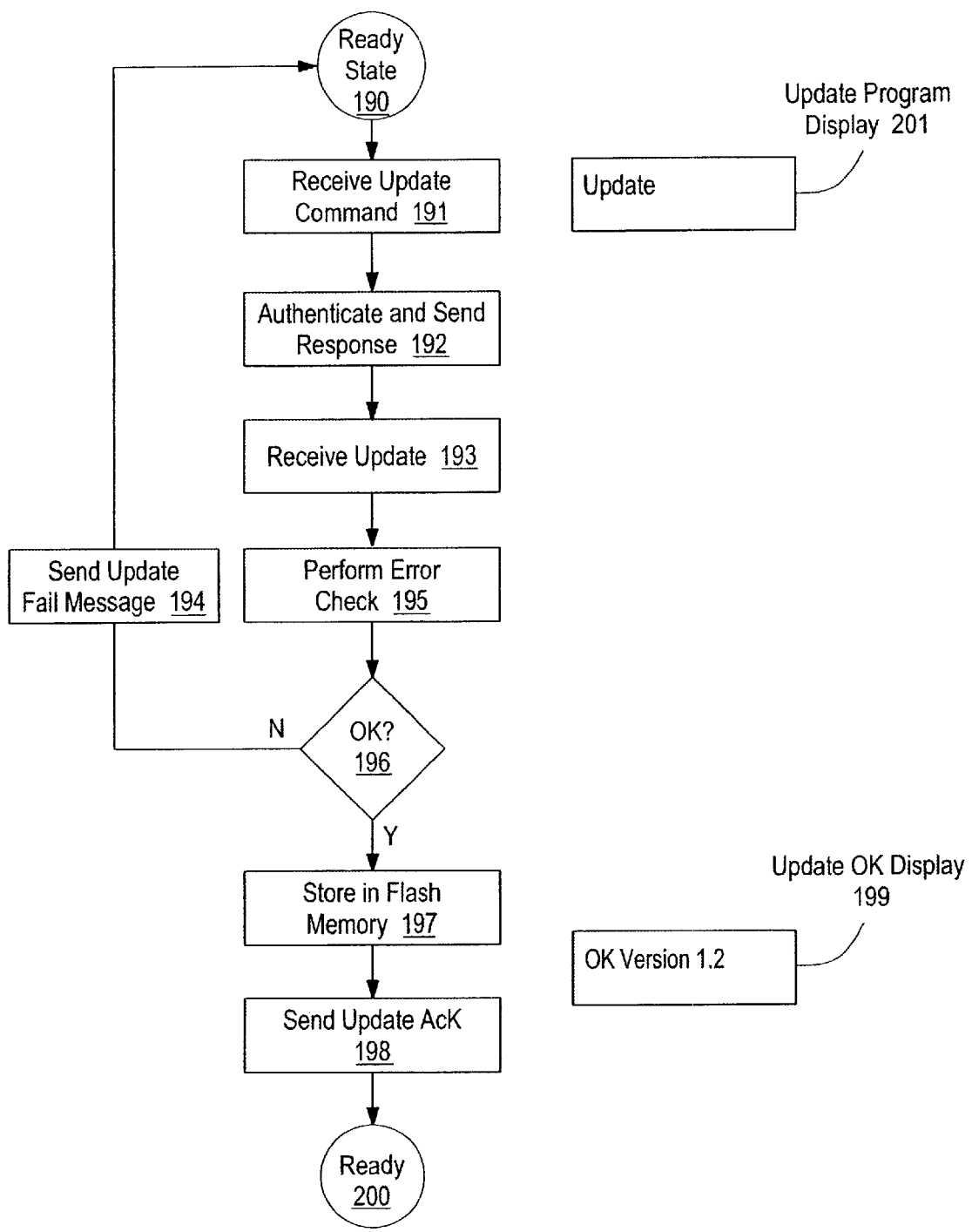
FIG. 10 shows a software flowchart of the disclosed control program change system.

A flow chart of steps performed by an illustrative embodiment of the disclosed LAN Telephone during a control program update is illustrated in FIG. 10. The process of FIG. 10 is entered from a ready state 190. The process is initiated by receipt of an update command at step 191. The update command is sent by the call agent, which may reside on a network telephony server. The control program object code to be provided to the LAN telephone during the update may be stored on the network telephony server. When an operator desires to update the LAN telephones on the network, the operator initiates an update command from a network administration program. The call agent then sends an update command at step 191 to each LAN telephone within the network in turn. For example, the call agent may complete the update process for each individual LAN telephone before moving on to the next LAN telephone. In this way all of the LAN telephones in the network can be updated, automatically. The update process can be scheduled, so that the update is performed in an off hour.

The LAN Telephone then authenticates the update command at step 192. The LAN telephone may use an encrypted signature system to provide authentication of both the update command and subsequent data messages. Such authentication may be performed using a conventional authentication technique. Further in step 192, after authentication, the LAN Telephone send a response 192 indicating its readiness to receive the new code image. The call agent, in conjunction with the network administration program, then begins transmitting the update image, which is received at step 193. At this time, the entire load process is conducted under the control of control code located in the LAN telephone ROM 56. The load may be performed using IP TCP packet checking, and with a final, complete error check, using a standard CRC (Cyclic Redundancy Check) error checking system at step 195. If the new program image is received correctly, as determined at step 196, then the new control program will complete its load of the flash memory 57 at step 197. Otherwise, an update fail message is transmitted at step 194. In the case of a successful load, the LAN telephone returns an update acknowledge message at step 198, and returns to the ready state at step 200. As the LAN telephone enters the Ready state at step 200, it will be using the new control program. As the system administrator receives the acknowledgement that the new control program is ready, the system administrator logs the updated LAN Telephone as including its new control program revision, and then moves on to updating the next LAN Telephone scheduled for updating. If an error is detected during the final error check at step 195, and the LAN Telephone send the update fail message at step 194, the LAN telephone may then retry the update process. Successful completion of the update process will result in an "OK" revision message in the instrument display, as shown by the update OK display 199. While the LAN Telephone is undergoing an update, the update program display 201 is displayed on the instrument's status display 3.

The disclosed LAN Telephone is also capable of supporting a variety of audio accessories. Such accessories may be connected to the LAN Telephone base unit 6 via the enhanced USB system, as disclosed herein. One useful audio accessory is an external speakerphone. Many office telephones feature a "hands-free" built-in speakerphone. The disclosed LAN Telephone may include such a feature as well. However, because of the placement of the telephone on a user's desk, the effectiveness of built-in speakerphones may be limited. Often, a user's telephone is located behind, or to the side of their work surface. As a result, the ability of an internal speakerphone to pickup voices from the other side of the desk is limited. The external speakerphone described herein solves this problem.

Figure 11:
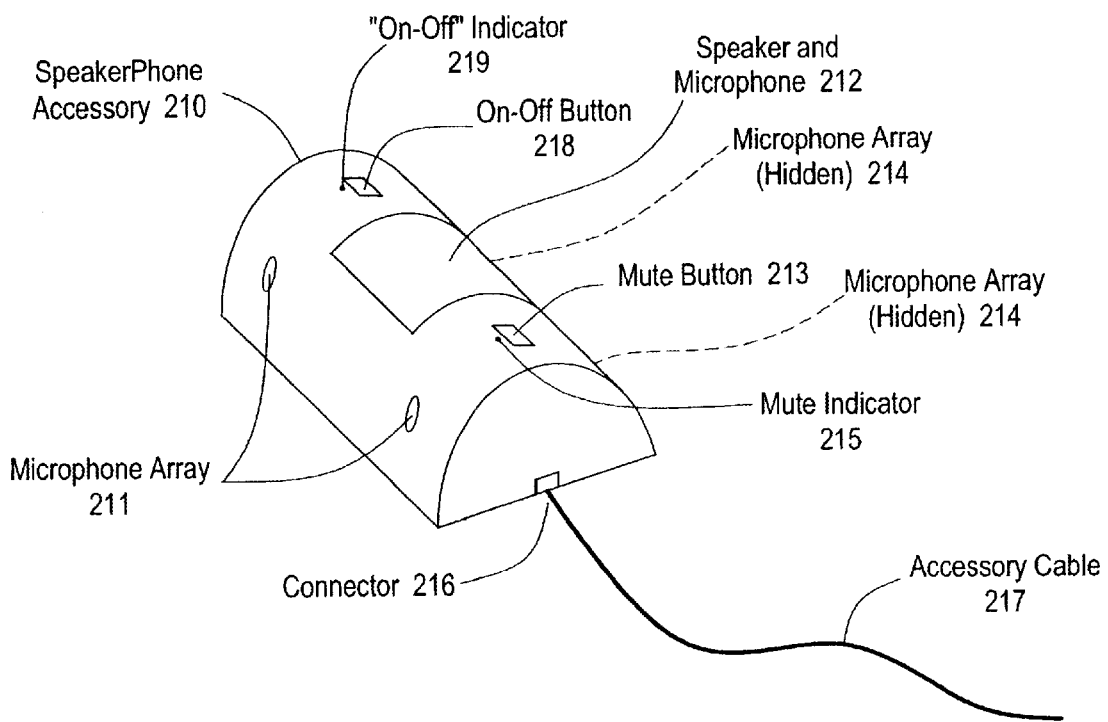
FIG. 11 shows a physical depiction of the disclosed external speakerphone accessory.

An illustrative embodiment of the disclosed external speakerphone 210 is shown in FIG. 11. The speakerphone 210 is shown as a pod connected to the base unit 6 (FIG. 1), via an accessory cable 217, through an accessory connector 4 (FIG. 1). As a result of the disclosed modifications to the USB interface described herein, the external speakerphone 210 can derive all of its power, audio, and control signals from the LAN Telephone base unit 6 (FIG. 1). Thus, the external speakerphone 210 may be placed on the main portion of a user's desk, even between the user and any visitors that may be sitting on the other side of the user's desk. Through its connection to the LAN Telephone, the external speakerphone 210 is able to operate in connection with any call that is active on the LAN Telephone.

The external speakerphone 210 includes two microphone arrays 211 and 214, located on each side of the pod. The microphone arrays 211 and 214 are used to receive voice audio from the primary telephone user, as well as from visitors to the primary telephone user's office. The microphone arrays 211 and 214, as well as the top microphones 212, enable to the LAN Telephone to discriminate and reject voices and noise from other locations in the office. The external speakerphone 210 also includes a speaker 212, which is used to output voice audio received from the distant party of the telephone connection. Also provided in the speakerphone 210 are a mute button 213, mute indicator 215, on-off button 218, and on-off indicator 219, which aid in operating the device.

Figure 12:
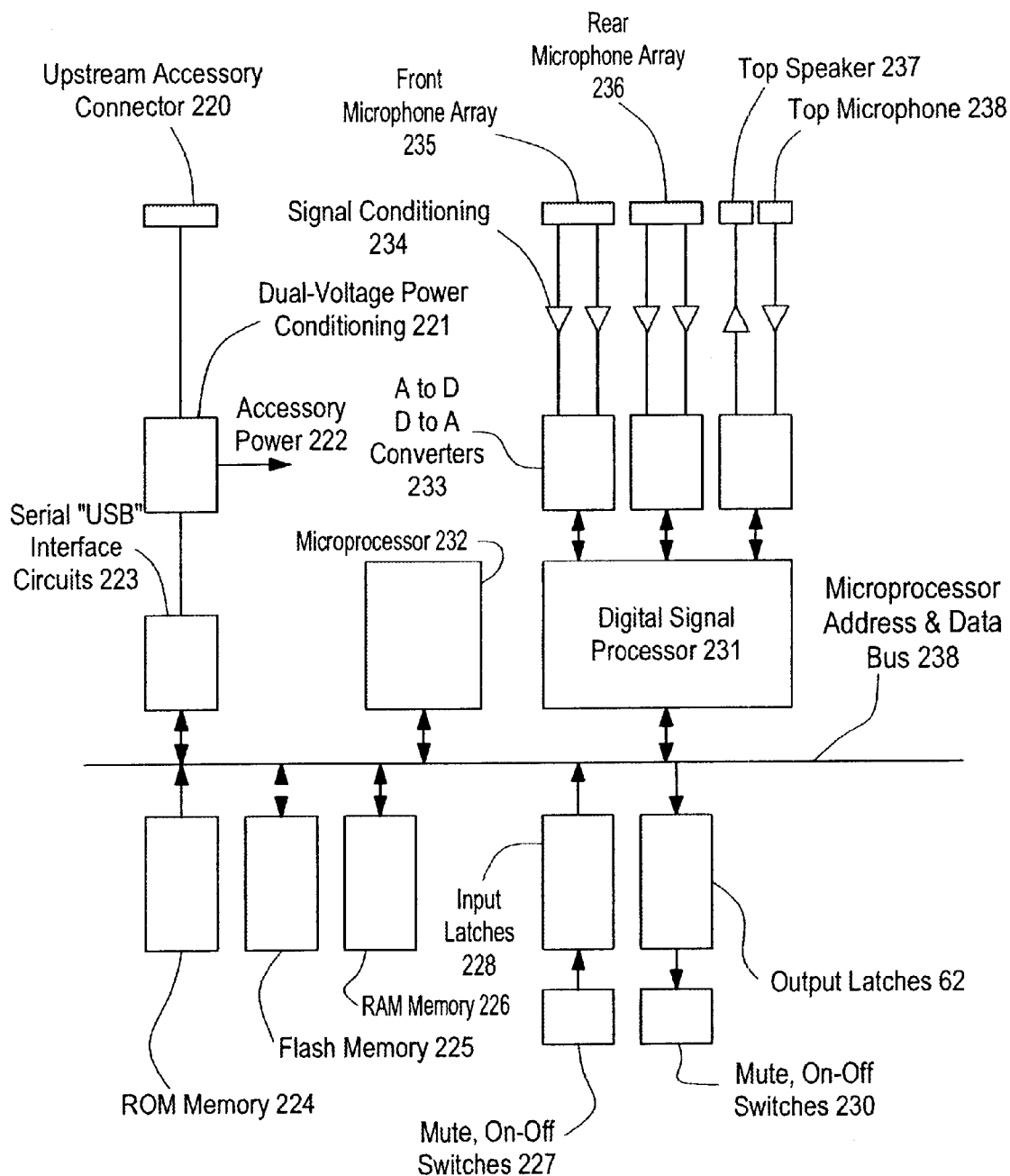
FIG. 12 shows a block diagram of the disclosed speakerphone accessory.

An internal block diagram of an illustrative embodiment of the external speakerphone 210 is shown in FIG. 12. The system of FIG. 12 is shown including a microprocessor 232, which controls an address and data bus 238. Attached to the microprocessor 232, via the bus 238, are a number of serial "USB" interface circuits 223. The circuit(s) 223 is used to communicate digital audio along with command and status information to the microprocessor 232. In some embodiments of the disclosed speakerphone accessory, two or more USB interfaces may be employed, for the attachment of other accessories. The microprocessor 232 also makes use of ROM 224, flash memory 225, and RAM 226. For example, initialization and update routines may be stored in ROM 224, the control program for the microprocessor and DSP 231 may be stored in the flash memory 225, and the variables and buffers may be stored in the RAM 226. The microprocessor 232 also controls the indicators 230 via output latches 229, and receives input from buttons 227 via the input latch 228. Finally, the microprocessor 232 controls the DSP 231 via a dual-port RAM that is internal to the DSP 231. In this way, the microprocessor 232 is able to load the DSP 231 prior to the beginning of operation. The DSP 231 provides the interface for the microphones 235, 236, and 238, as well as to the speaker 237. This interface is achieved through Analog to Digital (A to D) and Digital to Analog (D to A) converters 233. The converters 233 provide the transition between the buffered analog signals and the digital samples of those signals needed by the DSP 231. The signal conditioners 234 adapt the analog signals to and from the transducers 235, 236 and 238, in order to provide levels appropriate for the converters 233.

The DSP 231 executes a program that performs acoustic echo cancellation, as needed by the telephone network. The DSP 231 supports audio input and output. The DSP 231 performs two mathematical functions. First, the DSP 231 performs a directional algorithm, referred to as "beam-steering", for noise reduction and isolation, which operates to suppress any "off-axis" acoustic signals. Second, the DSP 231 performs a subtraction of received audio. The received audio that is subtracted consists of the audio received by the accessory that is output of the speakers of the accessory. The received audio is subtracted from the input signal obtained from the microphones 235, 236 and 238. The object of this acoustic echo canceling algorithm is to eliminate acoustic coupling, coming through the air from the speaker, from the audio signal that is transmitted to the distant end.

Figure 13:
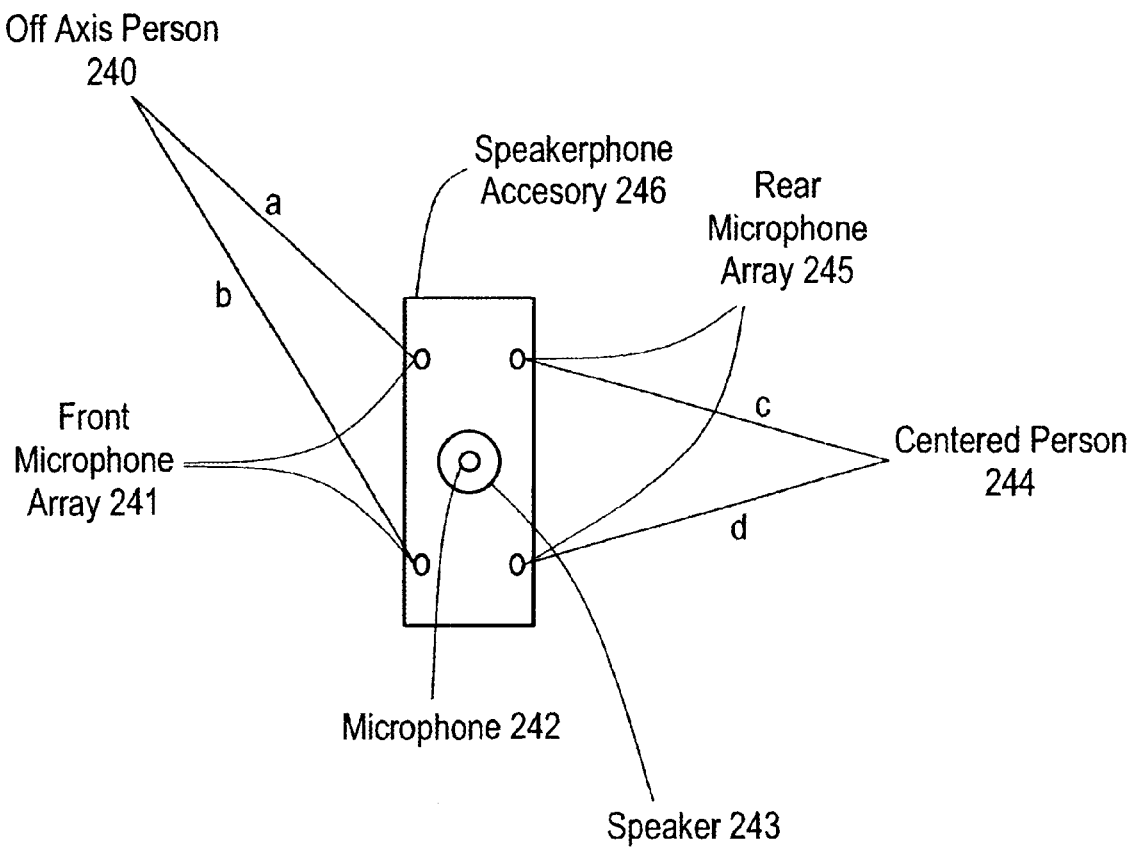
FIG. 13 illustrates the beam-steering technique of the disclosed speakerphone accessory.

A beam-steering technique is provided to suppress all acoustic wave fronts that are not coming directly from in front or behind the speakerphone 246 as shown in FIG. 13. FIG. 13 illustrates the disclosed technique, which operates to accentuate audio within the audio signal received through the various microphones of the device that is received from predetermined "on-axis" sources. The disclosed technique for suppressing off-axis audio signals received from the microphones of the device further operates to assist in beam-nulling with respect to attenuating the audio signal output from the speaker of the device, based on the directionality of the output of the speaker.

The digital sample signals are processed by the DSP 231 such that the delays between the two paths to the microphone arrays are used to subtract out signals that originate from off-axis sources. This is the case with paths "a" and "b" from the off-axis person 240 in FIG. 12. Such a delay does not exist between paths "c" and "d" from the centered person 244. The delays for paths "a" and "b" may, for example, be in the range of fractions of milliseconds in length. Through this technique, the audio from off-axis person 240 can be effectively suppressed, relative to the audio from the centered person 244. The top microphone 242 can also be used to help center the "beam" of greatest microphone sensitivity, so that the height of the audio sources is also considered. In this way, the top microphone 242 can be used to suppress audio signals that are not centered around a predetermined source height. In this way, two zones of maximum sensitivity are centered on either side of the speakerphone accessory 246. As further shown in FIG. 13, off-axis voice signals may be detected by either of the front microphone array 241 or the rear microphone array 245. Audio components determined to be "on-axis" may further be added to the received audio signal in order to emphasize audio from on-axis sources. Also in FIG. 13, a speaker 243 is shown for outputting audio signals from the speakerphone 246.

The subtraction of the audio signal output through the speakers from the input audio signal received through the various microphones of the speakerphone accessory may be performed via an algorithm that includes an adaptation aspect which factors in the physical layout of the room or operating environment in which the speakerphone accessory located. Such an adaptation process may operate to output a known signal in order to determine all necessary parameters related to the physical characteristics of the room or other operating environment. This audio adaptation may, for example, include dividing up the received audio from the distant phone into frequency bands and then each octave is processed separately. The objective is to select a subtraction factor that minimizes the presence of known input audio in the transmitted signal. Conventional algorithms of this type are well known, for example making use of Fourier transforms to characterize the office and user acoustic environment.

While the illustrative embodiments of the disclosed speakerphone accessory shown in FIGS. 11 and 13 have two opposing sides at which users are expected to be positioned, the disclosed speakerphone accessory is not limited to such a configuration. Accordingly, those skilled in the art will recognize that the beam-nulling and beam-steering aspects of the disclosed system may be applied to one or more sides of a speakerphone accessory, and that the speakerphone accessory itself may be embodied in a variety of specific shapes.

Those skilled in the art should readily appreciate that various functions of the invention may be embodied using software or hardware components, or a combination of software of hardware components. Moreover, while the invention is described through the above exemplary embodiments, it will be understood by those of ordinary skill in the art that modifications to and variations of the illustrated embodiments may be made without departing from the inventive concepts herein disclosed. Accordingly, the invention should not be viewed as limited except by the scope and spirit of the appended claims.

What is claimed is:

1. A communications instrument for communicating over a computer network, comprising:
    a network interface for attachment to said computer network;
    a voice digitization subsystem, wherein said voice digitization subsystem is operable to convert voice data received from a user into a plurality of digitized voice samples;
    a sample packetization subsystem, wherein said sample packetization subsystem is operable to organize at least a portion of said plurality of digitized voice samples into at least one data packet; and
    a scheduled transmission subsystem, wherein said transmission subsystem is operable to transmit said at least one data packet through said network interface in accordance with a time schedule, wherein said time schedule defines a point in time within a schedule interval at which said scheduled transmission subsystem begins transmission of said at least one data packet, wherein said schedule interval repeats periodically, and wherein said scheduled transmission subsystem is further operable to determine a start time of said schedule interval in response to receipt of a heartbeat packet by said communications instrument from said computer network.

2. The communications instrument of claim 1, wherein said interface to said computer network comprises a local area network physical interface and a local area network media access controller.

3. The communications instrument of claim 1, wherein said voice digitization subsystem comprises at least one analog to digital converter.

4. The communications instrument of claim 1, wherein said sample packetization subsystem comprises program code operable to execute on a microprocessor within said communications instrument.

5. The communications instrument of claim 1, wherein said scheduled transmission subsystem comprises program code operable to execute on a microprocessor within said communications instrument.

6. The communications instrument of claim 1, wherein said sample packetization subsystem generates said at least one data packet in a format compatible with a local area network protocol.

7. The communications instrument of claim 6, wherein said local area network protocol is an Ethernet protocol.

8. The communications instrument of claim 1, wherein said sample packetization subsystem generates said at least one data packet in a format compatible with the Internet Protocol (IP).

9. The communications instrument of claim 8, wherein said at least one data packet includes header information, and wherein at least a portion of said header information is associated with a current telephone call between said communications instrument and a remote Communications instrument.

10. The communications instrument of claim 1, wherein said scheduled transmission subsystem is further operable to obtain schedule information defining said time schedule from a remote call agent in association with establishment of a communications session through said communications instrument.

11. A method of operating a communications instrument for communicating over a computer network, comprising:
    converting voice data received from a user into a plurality of digitized voice samples;
    organizing at least a portion of said plurality of digitized voice samples into at least one data packet;
    transmitting said at least one data packet through a network interface coupled to a computer network in accordance with a time schedule, wherein said time schedule defines a point in time within a schedule interval at which said transmission of said at least one data packet is begun, and wherein said schedule interval repeats periodically; and
    determining a start time of said schedule interval in response to receipt of a heartbeat packet by said communications instrument from said computer network.

12. The method of claim 11, wherein said transmitting further comprises passing said at least one data packet through a local area network physical interface and a local area network media access controller.

13. The method of claim 11, wherein said converting further comprises passing said voice data through an analog to digital converter within a voice digitization subsystem of said communications instrument.

14. The method of claim 11, wherein said converting is performed by program code executing on a microprocessor within said communications instrument.

15. The method of claim 11, wherein said transmitting is performed by program code executing on a microprocessor within said communications instrument.

16. The method of claim 11, wherein said organizing further comprises generating said at least one data packet in a format compatible with a local area network protocol.

17. The method of claim 16, wherein said generating said at least one data packet in a format compatible with a local area network protocol comprises generating said at least one data packet in an Ethernet protocol format.

18. The method of claim 11, wherein said organizing further comprises generating said at least one data packet in a format compatible with the Internet Protocol (IP).

19. The method of claim 18, wherein said generating said at least one data packet includes generating header information, wherein at least a portion of said header information is associated with a current telephone call between said communications instrument and a remote communications instrument.

20. The method of claim 11, further comprising obtaining schedule information defining said time schedule from a remote call agent in association with establishment of a telephone session through said communications instrument.

21. A method for initializing a communications instrument, comprising:
    obtaining an Internet Protocol (IP) address for said communications instrument;
    obtaining an Internet Protocol (IP) address for a call agent server system; and
    using a call agent executing on said call agent server system to determine at least one time schedule for calls performed using said communications instrument, wherein said time schedule defines a point in time within a schedule interval at which said transmission of at least one data packet is begun, and wherein said schedule interval repeats periodically; and
    determining a start time of said schedule interval in response to receipt of a heartbeat packet by said communications instrument from said computer network.

* * * * *

UNITED STATES PATENT AND TRADEMARK OFFICE
CERTIFICATE OF CORRECTION

PATENT NO. : 6,556,564 B2
DATED : April 29, 2003
INVENTOR(S) : Steven A. Rogers

It is certified that error appears in the above-identified patent and that said Letters Patent is hereby corrected as shown below:

<u>Column 13,</u>
Line 59, ""y"" should read -- "Y" --.

Signed and Sealed this

Twentieth Day of January, 2004

JON W. DUDAS
*Acting Director of the United States Patent and Trademark Office*